(12) United States Patent
Morioka et al.

(10) Patent No.: US 6,738,372 B1
(45) Date of Patent: May 18, 2004

(54) VIDEO DATA COMMUNICATION DEVICE AND METHOD

(75) Inventors: Yoshihiro Morioka, Nara (JP); Masaaki Higashida, Osaka (JP); Satoshi Oyama, Hyogo (JP); Hiroshi Mitani, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/674,761

(22) PCT Filed: Mar. 6, 2000

(86) PCT No.: PCT/JP00/01328
§ 371 (c)(1),
(2), (4) Date: Jan. 26, 2001

(87) PCT Pub. No.: WO00/54466
PCT Pub. Date: Sep. 14, 2000

(30) Foreign Application Priority Data

Mar. 5, 1999 (JP) .......................... 11-058237
Sep. 9, 1999 (JP) .......................... 11-255230

(51) Int. Cl.[7] .............................................. H04L 12/56
(52) U.S. Cl. ................. 370/352; 370/395.64; 370/394; 714/748
(58) Field of Search ...................... 370/351, 352–356, 370/395.1, 395.5, 395.51, 395.52, 395.64, 389, 392, 394, 474, 465, 466, 485, 486; 348/14.01; 725/105, 135, 143; 714/746, 748

(56) References Cited

U.S. PATENT DOCUMENTS

| | | | |
|---|---|---|---|
| 5,548,532 A | * 8/1996 | Menand et al. | ............. 370/477 |
| 5,825,430 A | * 10/1998 | Adolph et al. | ............... 348/487 |
| 5,982,296 A | * 11/1999 | Wakasa et al. | ............... 370/392 |
| 6,091,726 A | * 7/2000 | Crivellari et al. | ............ 370/392 |
| 6,178,470 B1 | * 1/2001 | Dowling | ....................... 710/52 |
| 6,185,229 B1 | * 2/2001 | Obikane et al. | ............ 370/537 |
| 6,223,285 B1 | * 4/2001 | Komuro et al. | .............. 713/160 |
| 6,233,255 B1 | * 5/2001 | Kato et al. | ................... 370/486 |
| 6,275,471 B1 | * 8/2001 | Bushmitch et al. | ......... 370/248 |
| 6,584,509 B2 | * 6/2003 | Putzolu | ....................... 709/240 |

FOREIGN PATENT DOCUMENTS

| | | |
|---|---|---|
| JP | 4-120991 | 4/1992 |
| JP | 7-193580 | 7/1995 |
| JP | 8-274785 | 10/1996 |
| JP | 11-163934 | 6/1999 |
| JP | 2000-83192 | 3/2000 |
| WO | WO99/63717 | 12/1999 |

OTHER PUBLICATIONS

Japanese search report for PCT/JP00/00956 dated Apr. 18, 2000.

English translation of Form PCT/ISA/210.

(List continued on next page.)

*Primary Examiner*—Ajit Patel
(74) *Attorney, Agent, or Firm*—RatnerPrestia

(57) ABSTRACT

This invention presents an apparatus for composing an ATM wrapper transmission block capable of handling plural pieces of program information transmitted in SDTI or IP packet commonly by a low overhead. Since the ATM wrapper transmission block conforms to both AAL1 system and AAL5 system, sequential connection is possible by changing over the AAL1 transmission and AAL5 transmission in the ATM wrapper layer. Further, by the AAL5 system, live transmission output of minimum transmission delay, and contribution output free from error can be issued at the same time, and therefore the error is corrected by referring to the reception data in the former, and the error is corrected by re-sending the error position data in the latter.

34 Claims, 27 Drawing Sheets

OTHER PUBLICATIONS

SMPTE Journal, "EBU/SMPTE Task Force for Harmonized Standards for the Exchange of Program Material as Bitstreams—Final Report: Analyses and Results (Jul. 1998)", See: 4.7 Wrapper formats (p. 689–696), 5. Networks and Transfer Protocols (p. 699–707) and E.3. Streaming (p. 804–812).

Computer Communications, vol. 20 Issue 2 (Mar. 1997) p. 106–114, Profumo A. et al. "Compararive Analysis of MPEG and ATM Multiplexing Functions for Multimedia Interactive Services".

Computer Networks and ISDN Systems, vol. 29 Issue 17–18, (Feb. 1998) p. 2021–2037, Mehaoua ahmed et et al., "Performance Analysis of Cell Discarding Techniques for Best Effort Video Communications over ATM Netorks".

ITE'98: 1998 ITE Annual Convention, Real–time Transmission of DVCPR050/Progressive Compressed Signal over ATM Network, S. Ohyama et al.

* cited by examiner

SDTI information

Fig. 3  DV-based Object

| Sub-DIF Seq. 0 (1766 bytes) | Sub-DIF Seq. 1 (2566 bytes) | Sub-DIF Seq. 2 (2566 bytes) | Sub-DIF Seq. 3 (2566 bytes) | Sub-DIF Seq. 4 (2566 bytes) |
|---|---|---|---|---|
| Seq. No | Seq. No | Seq. No | Seq. No | Seq. No |
| H0 SC0 SC1 VA0 VA1 VA2 | A1 V15 V16 V17 V18 V19 | A3 V45 V46 V47 V48 V49 | A5 V75 V76 V77 V78 V79 | A7 V105 V106 V107 V108 V109 |
| A0 V0 V1 V2 V3 V4 | A2 V30 V31 V32 V33 V34 | A4 V60 V61 V62 V63 V64 | A6 V90 V91 V92 V93 V94 | A8 V120 V121 V122 V123 V124 |
| V5 V6 V7 V8 V9 | V20 V21 V22 V23 V24 | V50 V51 V52 V53 V54 | V80 V81 V82 V83 V84 | V110 V111 V112 V113 V114 |
| V10 V11 V12 V13 V14 | V25 V26 V27 V28 V29 | V55 V56 V57 V58 V59 | V8 V86 V87 V88 V89 | V115 V116 V117 V118 V119 |
|  | V35 V36 V37 V38 V39 | V65 V66 V67 V68 V69 | V95 V96 V97 V98 V99 | V125 V126 V127 V128 V129 |
|  | V40 V41 V42 V43 V44 | V70 V71 V72 V73 V74 | V100 V101 V102 V103 V104 | V130 V131 V132 V133 V134 |

| Sub-DIF Seq. | Seq. No | | | | | | | | | | | | | | | | |
|---|---|---|---|---|---|---|---|---|---|---|---|---|---|---|---|---|---|
| Sub-DIF Seq. 0 | A5 | A6 | H0 | SC0 | SC1 | VA0 | VA1 | VA2 | | | | | | | | | |
| | | | A0 | V0 | V1 | V2 | V3 | V4 | V5 | V6 | V7 | V8 | V9 | V10 | V11 | V12 | V13 | V14 |
| Sub-DIF Seq. 1 | H7 | A8 | A1 | V15 | V16 | V17 | V18 | V19 | V20 | V21 | V22 | V23 | V24 | V25 | V26 | V27 | V28 | V29 |
| | | | A2 | V30 | V31 | V32 | V33 | V34 | V35 | V36 | V37 | V38 | V39 | V40 | V41 | V42 | V43 | V44 |
| Sub-DIF Seq. 2 | H0 | A0 | A3 | V45 | V46 | V47 | V48 | V49 | V50 | V51 | V52 | V53 | V54 | V55 | V56 | V57 | V58 | V59 |
| | | | A4 | V60 | V61 | V62 | V63 | V64 | V65 | V66 | V67 | V68 | V69 | V70 | V71 | V72 | V73 | V74 |
| Sub-DIF Seq. 3 | A1 | A2 | A5 | V75 | V76 | V77 | V78 | V79 | V80 | V81 | V82 | V83 | V84 | V85 | V86 | V87 | V88 | V89 |
| | | | A6 | V90 | V91 | V92 | V93 | V94 | V95 | V96 | V97 | V98 | V99 | V100 | V101 | V102 | V103 | V104 |
| Sub-DIF Seq. 4 | H3 | A4 | A7 | V105 | V106 | V107 | V108 | V109 | V110 | V111 | V112 | V113 | V114 | V115 | V116 | V117 | V118 | V119 |
| | | | A8 | V120 | V121 | V122 | V123 | V124 | V125 | V126 | V127 | V128 | V129 | V130 | V131 | V132 | V133 | V134 |

VIDEO DATA COMMUNICATION DEVICE AND METHOD

TECHNICAL FIELD

The present invention relates to a video data communication apparatus and method for communicating through a specified transmission route by converting an entered video data stream.

BACKGROUND ART

As a result of recent advancement in communication system using optical fibers, the communication capacity is expanded enormously, and systems for transmitting not only digital data used in computers, but also video signals, audio signals and other additional information by digitizing are being developed. For example, by employing an asynchronous transfer mode (ATM), high speed transmission using a network of 155 megabits/sec or higher is realized, and a video data communicating system on ATM is being put in practical use. The ATM is discussed and standardized in the ITU-T (International Telecommunication Union-Telecommunication Standardization Sector), and The ATM Forum and others, and many related publications are available.

Examples of transmitting video data of coding method of consumer-use digital VTR by ATM network are disclosed in "DVC Nonlinear Editing System using ATM/WAN" at the annual meeting of Video Information Media Society, 1997, No. 23-5, "Multicast/Real-time Transmission of DV/DVCPRO Data by ATM Network" at the winter meeting of Video Information Media Society, December 1997, No. 3-6, "Real-time Transmission of DVCPRO50 Compressed Signals by ATM Network" at the meeting of Video Information Media Society, July 1998, and "DVCPRO25/50 Transmission System over ATM and Fibre Channel" at International Broadcasting Convention (IBC), November 1998, conference paper p. 567.

In this method, as the transmission protocol for putting the so-called DV-based signal compressed and coded by the DV system or DVCPRO system (the compression method mentioned in SMPTE Standard 314M) on the ATM cell, first, the TCP/IP protocol is utilized. In the TCP/IP, a greater buffer capacity than the buffer capacity for the processing time to re-send is needed in order to compensate for transmission errors on the network, and the delay is more than dozens of frames. As a result, while real-time communications between two parties are carried out in a long distance, sound and picture of the talk are delayed, and the communication is unnatural, and hence it has been demanded to shorten the delay time.

To decrease the delay, it is proposed to map DV-based signals directly in ATM layer without using TCP/IP protocol, and transmit by so-called Native ATM. For this purpose, the ATM adaptation type 1 (AAL1) or ATM adaptation type 5 (AAL5) is used. Since the AAL1 system has the transmission mechanism of clock information and forward error correction (FEC) mechanism, clock reproduction and error compensation of ATM network are possible at the reception side.

Therefore, the use of AAL1 is being started in the field of contribution relating to creation of contents for broadcasting, production and so on. At the present, however, the transmission apparatus using the AAL1 system is expensive, and the less expensive AAL5 transmission system is preferred in the general business field limited in the budget for communication system.

The AAL5 system is widely used in the field of computer network because the protocol process in the AAL layer is simple. For transmission of real-time AV signals using AAL5, the clock reproduction mechanism and error compensation mechanism must be added in the upper layer of the AAL5 layer, which is realized by the methods mentioned above.

In these conventional methods, however, only the DV-based signals can be transmitted by using the AAL1 or AAL5. For example, the stream transmitted in the SDTI system (SMPTE305M standard) enabling to transmit DV-based signal at 4-speed rate or transmit plural programs cannot be relayed by the ATM network by converting into ATM signal directly, that is, seamlessly without converting into other transmission format.

At the present, efforts of research and development are intensively concentrated on the high speed IP network of the next generation applying the WDM (wavelength division multiplex) technology and Next Generation Internet (NGI). It is demanded to adopt the high quality AV signals in the Internet protocol (IP) of which standard is being discussed at the IETF (Internet Engineering Task Force), that is, the present IPv4, or the IPv6 considered to be used widely in the future, but the present problems are that the DV-based signals or other high quality AV signals cannot be transmitted on the IP high speed network, IP over WDM or other next generation high speed key networks by formatting into IP packet, and that the received IP packet cannot be transmitted on the ATM network by converting directly into the ATM packet.

In the streaming using the AAL5 system, only by detecting the ATM cell loss or bit error at the reception side, it is a simple process of discarding the PDU (protocol data unit) including the error only, and the end-to-end transmission delay is small. On the other hand, when the PDU is discarded by error, the frame data to be reorganized by using the PDU is imperfect, and the video signal must be concealed, and the audio signal must be muted, so that the effect of the error must be limited to a minimum. That is, since the streaming using the AAL5 is small in delay and is suited to real-time live transmission, but not suited to contribution in which error-free information transmission is demanded.

SUMMARY OF THE INVENTION

The invention is devised in the light of the above problems, and it is hence an object thereof to present a video data communication apparatus capable of converting the SDTI signal or information transmitted in IP packet directly into the ATM packet, and further to present a video data communication apparatus capable of realizing both live transmission of low delay and error-free contribution by using the AAL5.

To achieve the object, the invention presents a video data communication apparatus comprising input means for entering a data stream including video data, header information extracting and combining means for extracting specified information from the header included in the input data stream, shuffling, and creating other header information, video data extracting and combining means for extracting video data included in the input data stream and arranging in specified sequence, and wrapper generating means for multiplexing the output of the header information extracting and combining means and the output of the video data extracting and combining means, and combining into one wrapper transmission block. In particular, the data stream to be entered is SDTI stream, IP packet data, or FC-AC stream of ANSI standard, and it is particularly effective if the video data to be transmitted as the payload of the data stream is data of DV system or DVCPRO system.

The invention further comprises receiving means for receiving a data stream and extracting video data, memory means for temporarily storing the extracted video data, error detecting means for detecting presence or absence of error of the extracted video data, error compensation means for compensating the error portion of the extracted video data, and error processing means for requesting re-send of at least part of the extracted video data, and correcting the error portion of the extracted video data stored in the memory means on the basis of the video data re-sent according to the request, in which the video data of which error is compensated by the error compensation means are issued as live output, and the video data of which error is corrected by the error correcting means are issued as contribution.

The live transmission output is low in delay because it is issued after error compensation process by referring to the reception data. The contribution output is free from error because the error portion is corrected according to the re-sent data. Therefore, a live image is displayed on a monitor, and video data free from error due to transmission can be recorded in a VTR.

BRIEF DESCRIPTION OF THE DRAWINGS

FIG. 13 is an explanatory diagram of division of DV-based data signal into sub-blocks.

FIG. 16 is an explanatory diagram of division of DV-based data signal assigned with sequence number into sub-blocks.

FIG. 19 is an explanatory diagram of division of DV-based data signal doubled in audio data into sub-blocks.

FIG. 20 is an explanatory diagram of division in the case of doubling the audio data as independent block into sub-blocks.

BEST MODE FOR CARRYING OUT THE INVENTION

Figure 1:
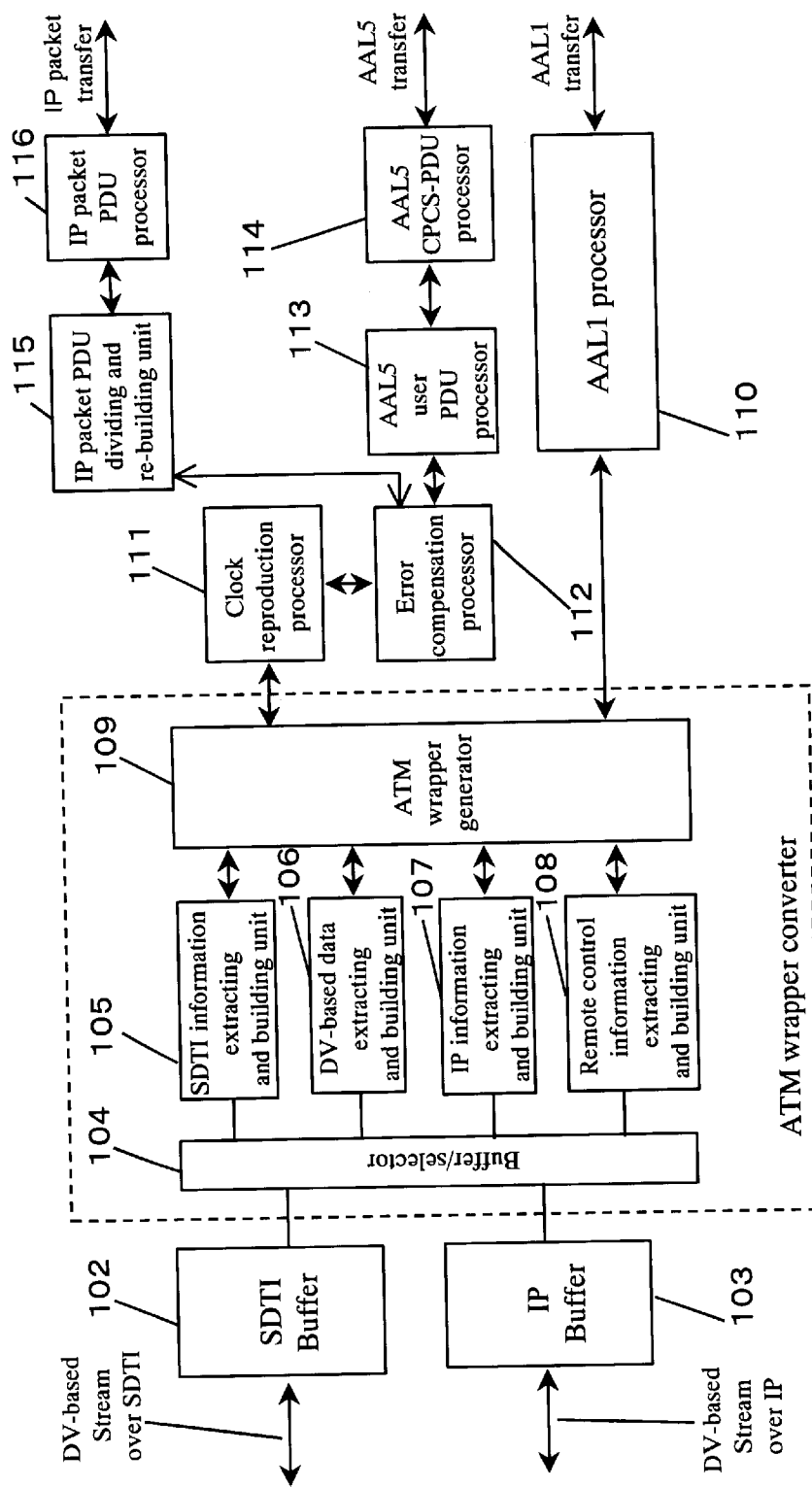
FIG. 1 is a block diagram showing a schematic configuration of a communication apparatus in a first embodiment.

Referring now to the drawings, embodiments of the invention are described in detail below. In the following embodiments, high-quality AV signals such as DV-based signals are transmitted by wide-area ATM or the like. As DV-based signals, for example, 25 Mbps compression, 525/60 signals conforming to SMPTE314 standard are used. The DV standard as the basis of the DV-based signals is disclosed in "Specifications of Consumer-Use Digital VCRs using 6.3 mm magnetic tape," December 1994, HD Digital VCR Conference, and the digital interface is defined, in "Specifications of Digital Interface for Consumer Electric Audio/Video Equipment," December, 1995, HD Digital VCR Conference. The SDTI standard is the SPTE305M.

ATM stands for asynchronous transfer mode, and principal standards are given below. The ATM protocol is specified in ITU-T I.316, the AAL1 protocol in ITU-T I.363.1, and the AAL5 protocol in ITU-T I.363.5. Signaling is specified, for example, in ITU-T Q.2931. The network quality required in the ATM network is specified in ITU-T I.356. The user network interface is designated in The ATM Forum, ATM User-Network Interface Specification Version 3.0 (hereinafter UNI3.00), the ATM Forum, ATM User-Network Interface Specification Version 3.1 (UNI3.1), and The ATM Forum, ATM User-Network Interface Specification Version 4.0 (UNI4.0).

(First Embodiment)

FIG. 1 is a block diagram showing a schematic configuration of a communication apparatus in a first embodiment of the invention. In FIG. 1, reference numeral 101 is an ATM wrapper converter. In FIG. 1, an SDTI signal using a DV-based signal is entered in an SDTI buffer 102. The SDTI signal entering the buffer 102 is sent into an SDTI information extracting and building unit 105 by way of a buffer/selector 104, and the SDTI information is extracted. Similarly, it is sent also into a DV-based data extracting and building unit 106, and the DV-based signal is extracted.

Figure 2:
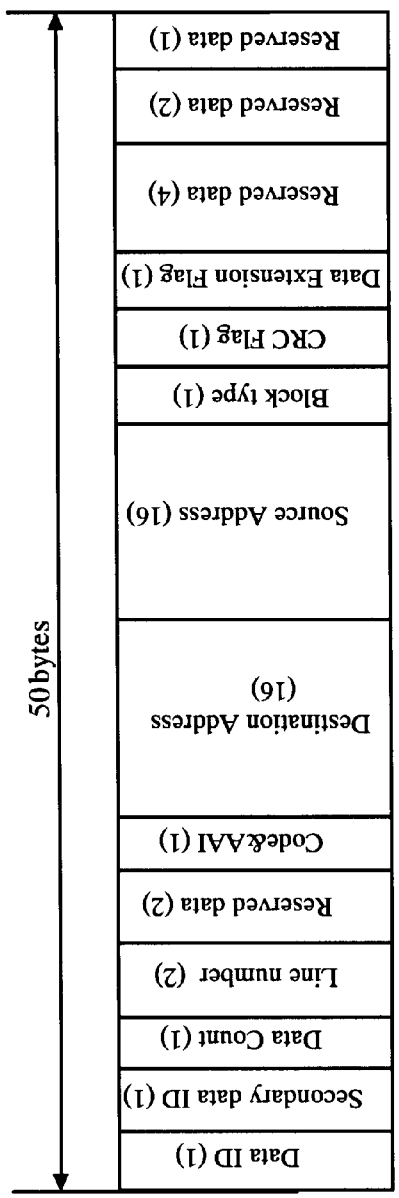
FIG. 2 is an explanatory diagram of SDTI information.
Figure 3:
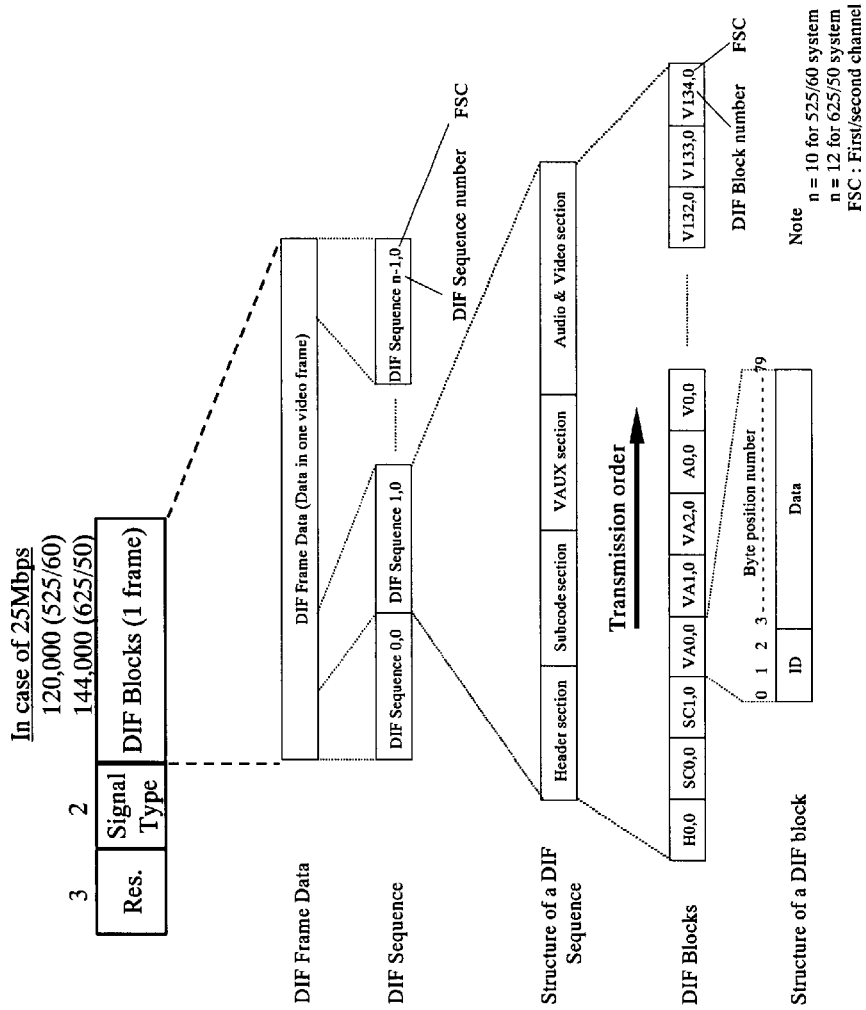
FIG. 3 is an explanatory diagram of DV-based signal.

FIG. 2 shows the SDTI information extracted and built from the SDTI header of the SDTI signal in the unit 105. The SDTI information in FIG. 2 is the information obtained by converting the SDTI header specified in the SMPTE standard 305M, which is a signal obtained by excluding 3 words "Ancillary Data Flag" from the SDTI header composed of 53 words with 10 bits per word, converting "Line Number 1" to "Reserved data", and extracting lower 8 bits from the LSB of all words of the 50-word data. In the DV-based data extracting and building unit 106, the DV-based signal is extracted from the entered SDTI signal. An example of 25 Mbps compressed DV-based signal to be extracted is shown in FIG. 3.

Figure 4:
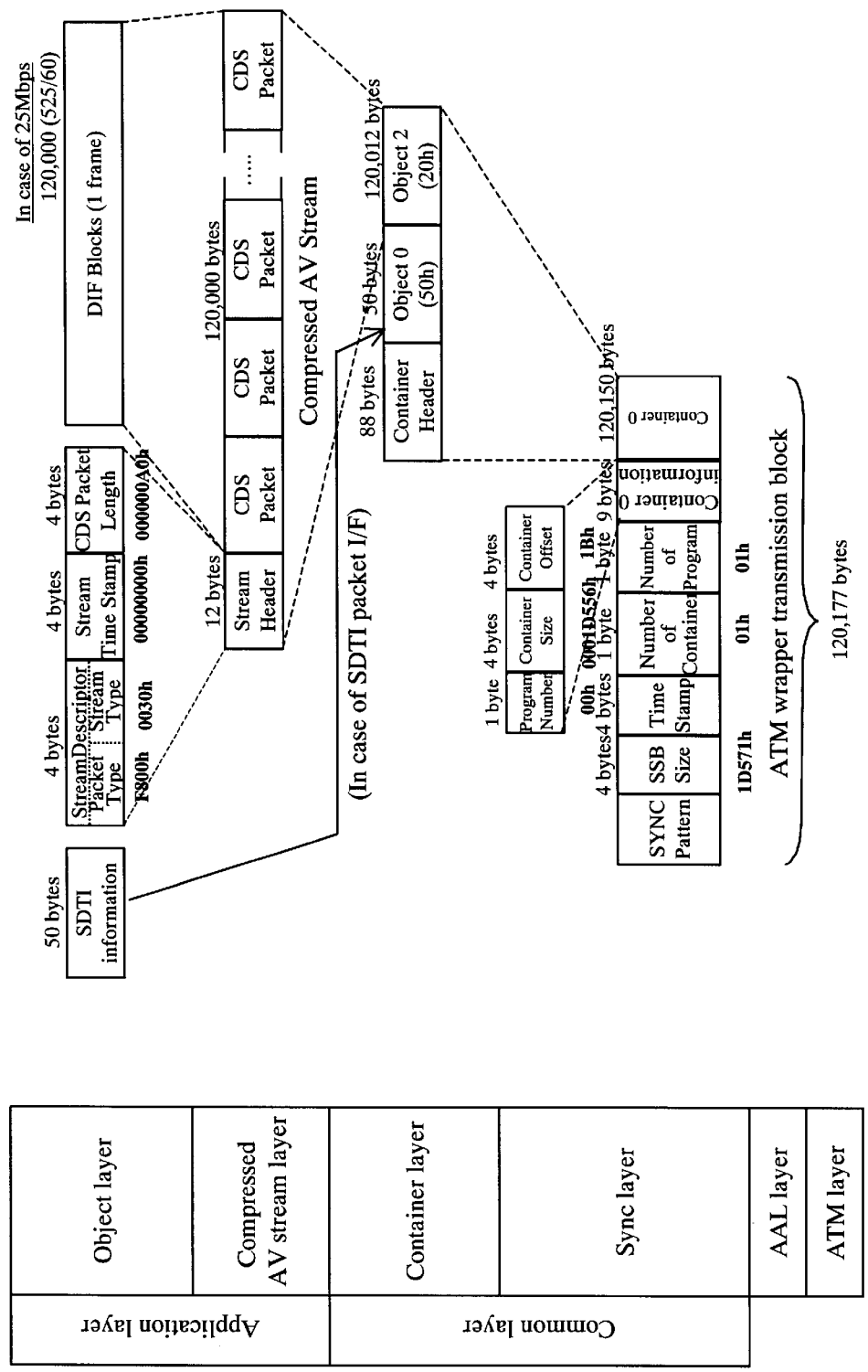
FIG. 4 is an explanatory diagram of an example of generation of ATM wrapper transmission block by SDTI information and DV-based signal.

In FIG. 1, in an ATM wrapper generator 109, the SDTI information and DV-based signal entered from the units 105 and 106 are converted into the ATM wrapper transmission block by the protocol processing shown in FIG. 4.

Referring to FIG. 4, an example of ATM wrapper composition is explained. The ATM wrapper is composed of an upper layer of application layer and a lower layer of common layer. The application layer is further divided into an upper layer of object layer and a lower layer of compressed AV layer. In the object layer, there are SDTI information, stream descriptor, stream time stamp, CDS packet length, and DIF signal for one frame. Herein, SDTI information, stream descriptor, stream time stamp, and CDS packet length are generated from the SDTI signal entered into the transmission apparatus. The compressed AV stream layer is generated from the stream descriptor, stream time stamp, CDS packet length, and DIF signal for one frame.

The common layer is further divided into an upper layer of container layer and a lower layer of sync layer. In the container layer, a container header specified in FC-AV is generated from the SDTI information and compressed AV stream. In the sync layer, the sync pattern, SSB size, time stamp, number of containers, container information, and the container itself are combined, and an ATM wrapper block is generated.

The ATM wrapper transmission block is transferred to an ATM physical layer through an AAL layer.

The operation at the transmission side is explained above. A reverse operation is done at the reception side.

The container structure in the container layer is described in the following document: T11 Project 1237-D/Rev 1.0, Information technology, Fibre Channel, Audio Video (FC-AV), Sep. 30, 1998 (cited from http// www.fibrechannel.com/search/index.htm, 98-042vA.pdf, Chapter 10).

In the FC-AV container, object 0 is mapped with SDTI information, and object 2 with DV-based signal through compressed AV stream. Having the protocol structure as shown in FIG. 4, plural objects, that is, plural pieces of information can be assembled in one transmission block. In FIG. 4, since data for one frame is mapped in one ATM wrapper transmission block, the overhead of SDTI information is smaller than the SDTI transmission route. In the ATM wrapper transmission block, the sync pattern is used for synchronizing the data for one frame. Further, in the ATM wrapper transmission block, since the number of containers and the number of programs are transmitted as the header information, if there are plural containers and plural programs in one ATM wrapper transmission block, the program numbers can be distinguished easily.

Figure 26:
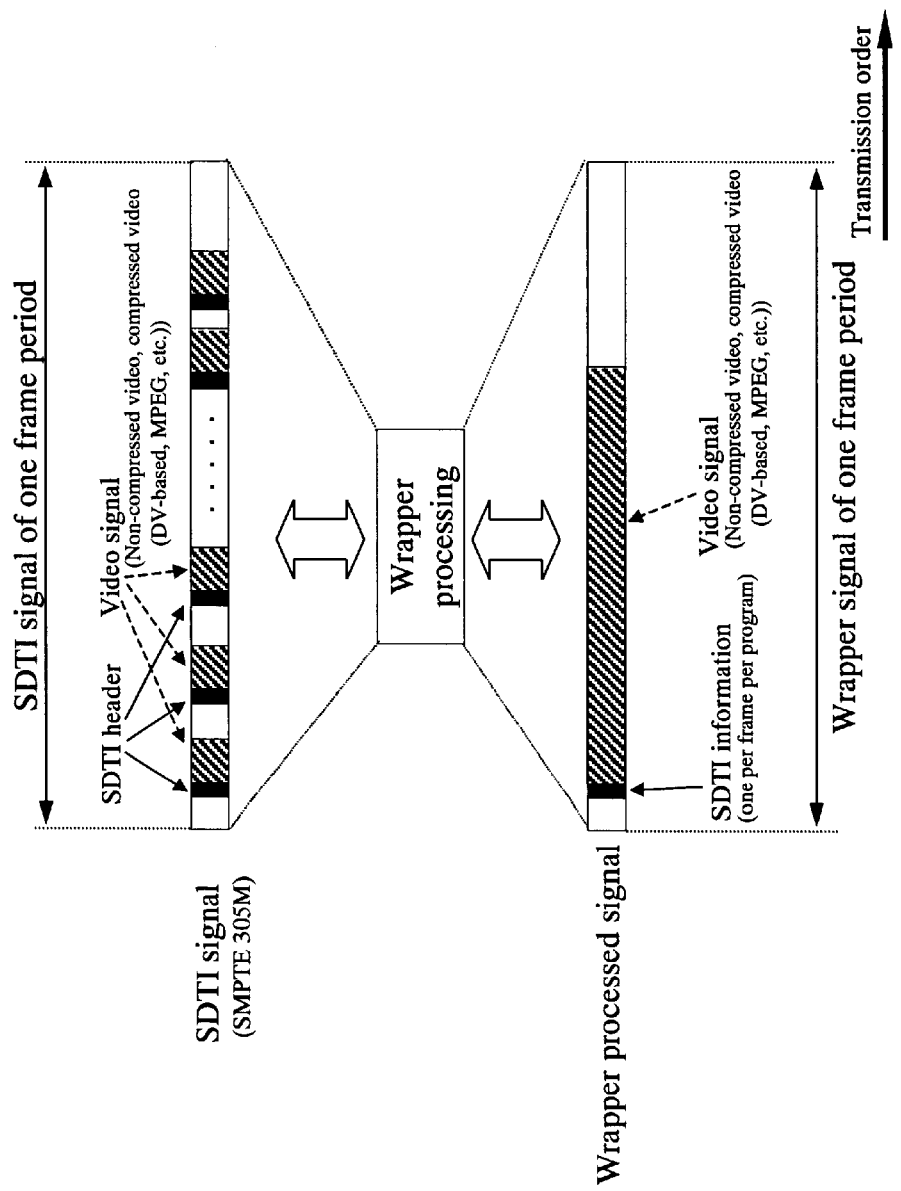
FIG. 26 is a conceptual diagram in the case of transmission of one program by one ATM wrapper transmission block.
Figure 27:
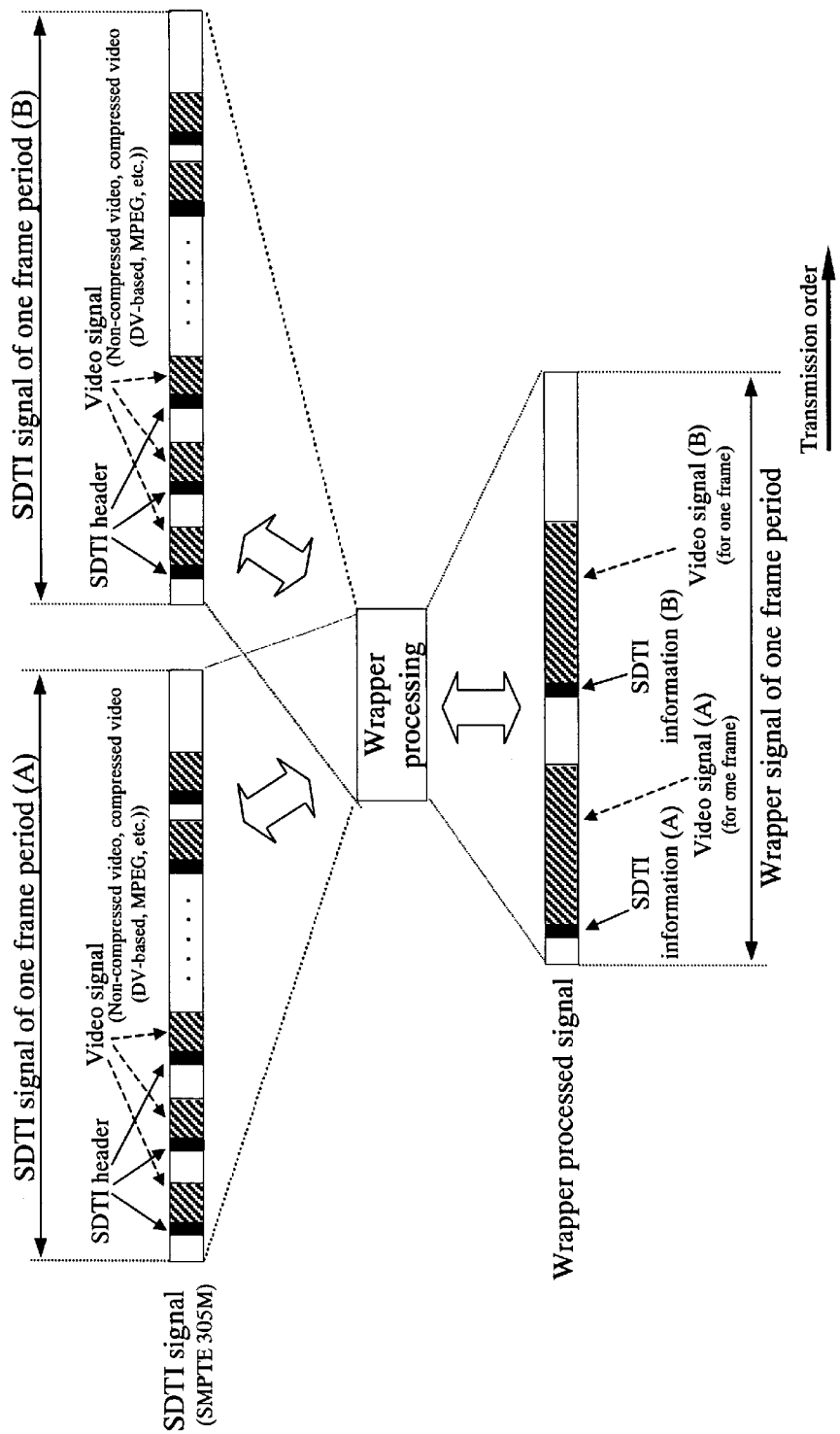
FIG. 27 is a conceptual diagram in the case of transmission of two programs by one ATM wrapper transmission block.

FIG. 26 is a conceptual diagram in the case of transmission of one program by one ATM wrapper transmission block, and FIG. 27 is a conceptual diagram in the case of transmission of two programs by one ATM wrapper transmission block.

Although omitted in the explanation above, in a remote control information extracting and building unit 108, as required, remote control information included in the input signal (conforming to Odetics, Lauth, and other RS422 control signal) is extracted, and is sent into the ATM wrapper generator 109, and remote control information is further added to the SDTI information and DV-based signal entered from the units 105 and 106 to convert into an ATM wrapper transmission block.

In FIG. 1, this ATM wrapper transmission block is sent into an AAL1 processor 110, and converted into an ATM packet according to the process defined in the ITU-TI363.1, and then sent out into the ATM network.

Figure 5:
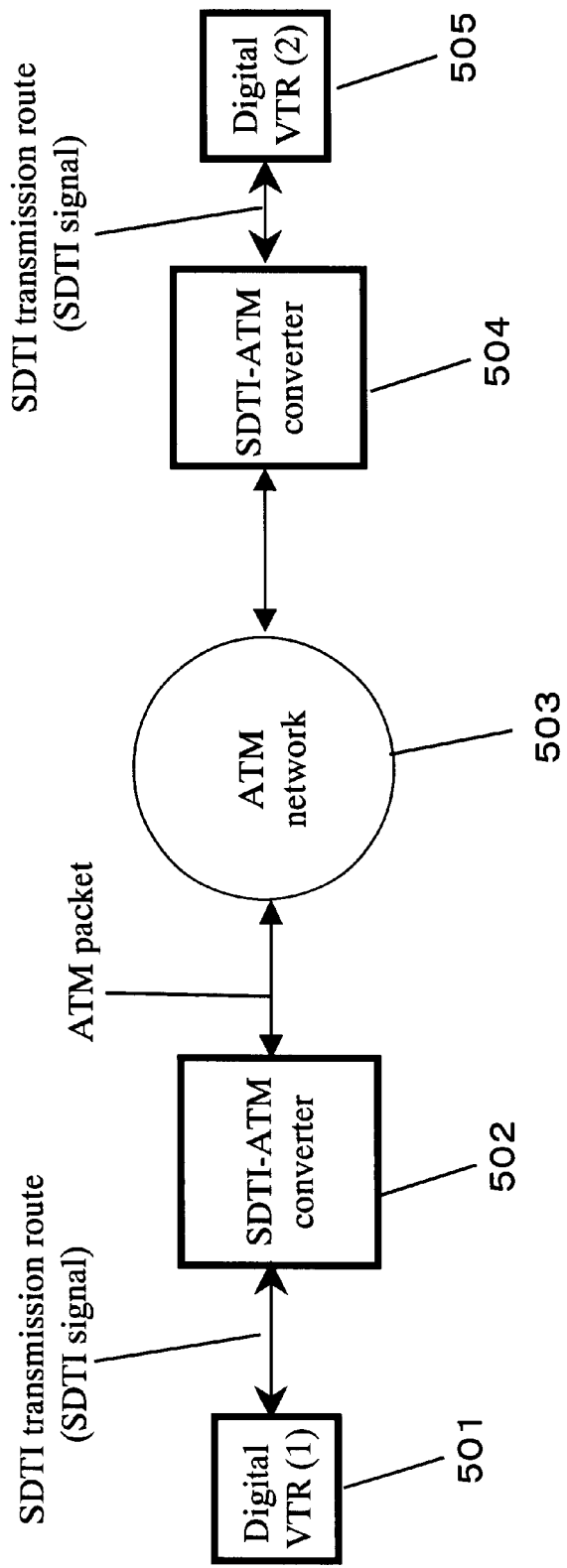
FIG. 5 is an explanatory diagram of an example of configuration of transmission system using ATM network.

A configuration for transmitting the SDTI signal through the ATM network is explained by referring to FIG. 5. In FIG. 5, from a digital VTR (1) 501, the SDTI signal is transmitted to an SDTI-ATM converter 502 by way of an SDTI transmission route. In the SDTI-ATM converter 502, an ATM wrapper transmission block is generated by the signal conversion mentioned above, and it is divided into ATM packets, and transmitted to an SDTI-ATM converter 504 through an ATM network 503. In the SDTI-ATM converter 504, from the ATM wrapper transmission packet, SDTI information and DV-based signal are restored, and combined again into SDTI signal, and transmitted into a digital VTR (2). These signal processings are reverse converting processes of the process in the SDTI-ATM converter 502 in terms of logic function. In stationary transmission state, since the SDTI information is a fixed pattern, the signal processing delay in the SDTI-ATM converter is very small. In FIG. 5, further, by processing in the reverse procedure as mentioned above, it is also possible to transmit from the digital VTR (2) 505 to the digital VTR (1) 501 through the ATM network 503. In this embodiment, the video signal to be entered is the DV-based signal, but as far as it is a digital video signal, any other signal may be used, such as a signal compressed by other method such as MPEG, or a non-compressed signal.

(Second Embodiment)

Referring again to FIG. 1, a second embodiment of the invention is explained. In FIG. 1, an IP packet signal using a DV-based signal is entered in a buffer 103. The IP packet signal entering the buffer 103 is sent into an IP information extracting and building unit 107 and a DV-based data extracting and building unit 106 by way of an IP buffer/ selector 104, and the IP packet information and DV-based signal are extracted.

Figure 6:
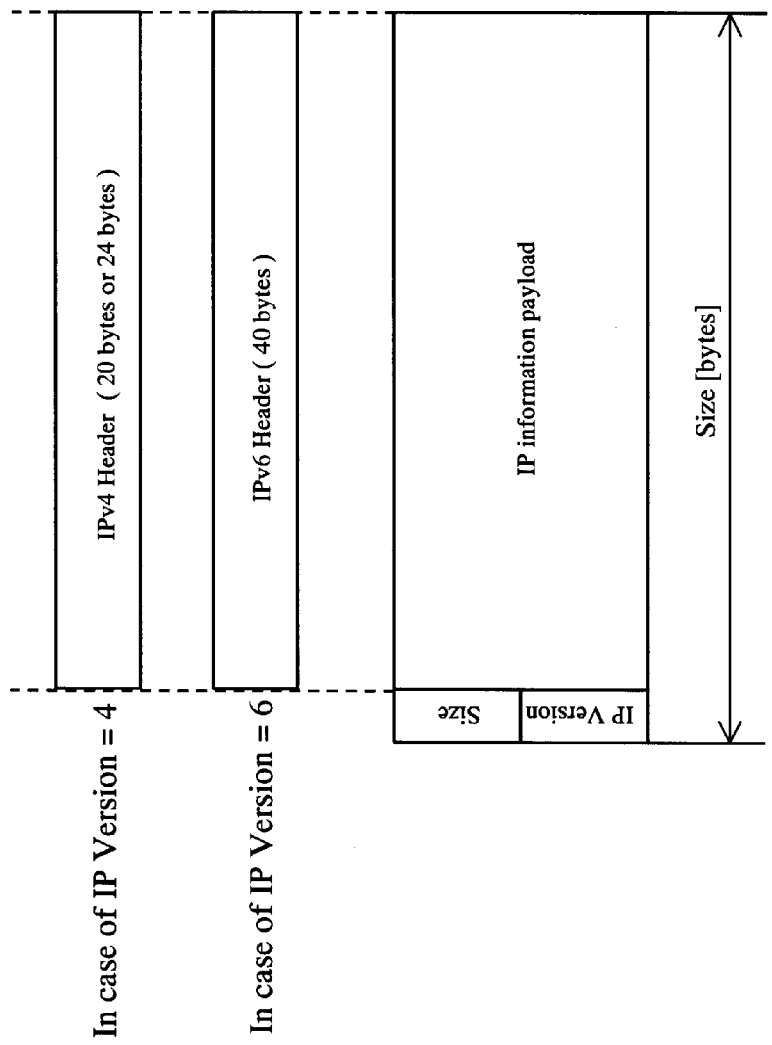
FIG. 6 is an explanatory diagram of IP information.

FIG. 6 shows the IP packet information extracted in the IP information extracting and building unit 107. The IP packet information in FIG. 6 is a data block of which payload is IPv4 (RFC791) or IPv6 (RFC2460) specified in IEFT (Internet Engineering Task Force). In FIG. 6, the IP version is 4 bits, and the size is 4 bits. In the case of IPv4, the size of the IP information is 21 bytes or 25 bytes. In the case of IPv6, the size of the IP information is 41 bytes.

Figure 7:
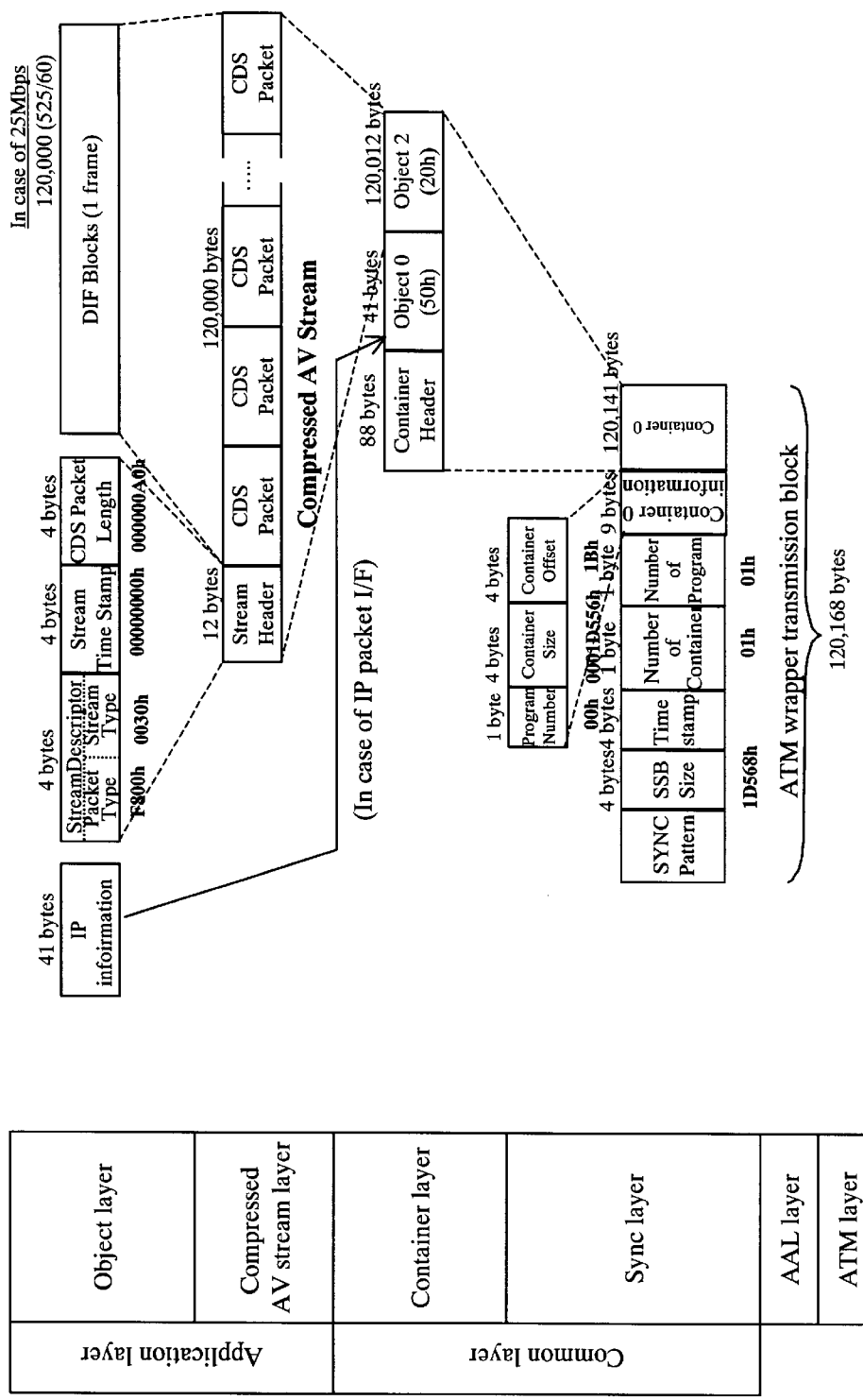
FIG. 7 is an explanatory diagram of an example of generation of ATM wrapper-transmission block by IP information and DV-based signal.

In FIG. 1, in an ATM wrapper generator, the IP information and DV-based signal entered from the units 107 and 106 are converted into the ATM wrapper transmission block by the protocol processing shown in FIG. 7. The ATM wrapper transmission block is same as in the first embodiment. In the FC-AV container, object 0 is mapped with IP information, and object 2 with DV-based signal through compressed AV stream. Having the protocol structure as shown in FIG. 7, plural objects, that is, plural pieces of information can be assembled in one transmission block. In FIG. 7, since data for one frame is mapped in one ATM wrapper transmission block, the overhead of IP information is smaller than the IP transmission route. In the ATM wrapper transmission block, the sync pattern is used for synchronizing the data for one frame. Further, in the ATM wrapper transmission block, since the number of containers and the number of programs are transmitted as the header information, if there are plural containers and plural programs in one ATM wrapper transmission block, the program numbers can be distinguished easily.

In FIG. 1, this ATM wrapper transmission block is, same as in the first embodiment, sent into an AAL1 processor 110, and converted into an ATM packet according to the process defined in the ITU-TI363.1, and then sent out into the ATM network.

Also in FIG. 1, this ATM wrapper transmission block is sent into a clock reproduction processor 111, where a time stamp and a sync pattern are added, then it is further sent into an error compensation processor 112 to undergo FEC processing or interleaving processing as mentioned above, and is converted into an ATM packet by AAL5 processing specified in ITU-TI363.5 in an AAL5 user PDU processor 113 and an AAL5 CPCS-PDU processor 114, and is sent out into the ATM network.

Or, when processed as specified in an IP packet PDU dividing and re-building unit 115 and an IP packet PDU processor 116, it can be transmitted to the IP packet network as an IP packet.

Figure 8:
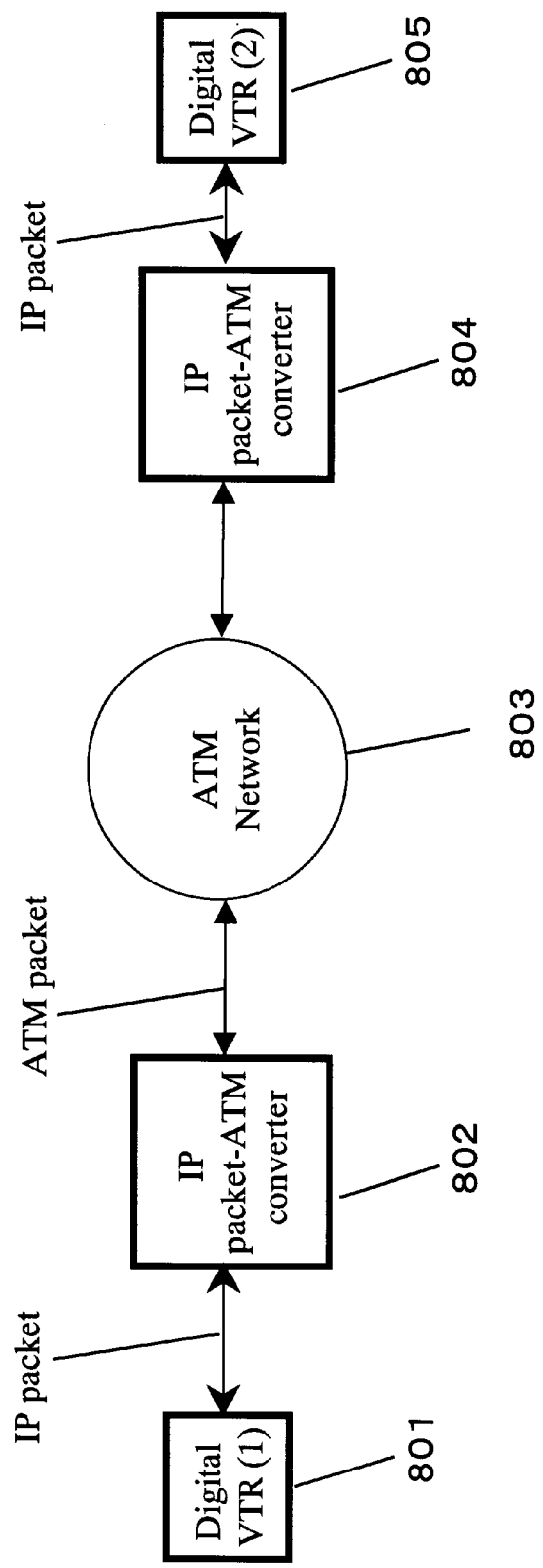
FIG. 8 is an explanatory diagram of an example of configuration of transmission system using IP network.

A configuration for transmitting the IP packet signal through the ATM network is explained by referring to FIG. 8. In FIG. 8, from a digital VTR (1) 801, the IP packet signal is transmitted to an IP packet-ATM converter 802 by way of an IP packet transmission route. In the IP packet-ATM converter 802, an ATM wrapper transmission block is generated by the signal conversion mentioned above, and it is divided into ATM packets, and transmitted to an IP packet-ATM converter 804 through an ATM network 803. In the IP packet-ATM converter 804, from the ATM wrapper transmission packet, IP information and DV-based signal are restored, and are combined again into an IP packet, and transmitted into a digital VTR (2) 805. These signal processings are reverse converting processes of the process in the IP packet-ATM converter 802 in terms of logic function. In stationary transmission state, since the IP information is a fixed pattern, the signal processing delay in the IP packet-ATM converter is very small.

Figure 9:
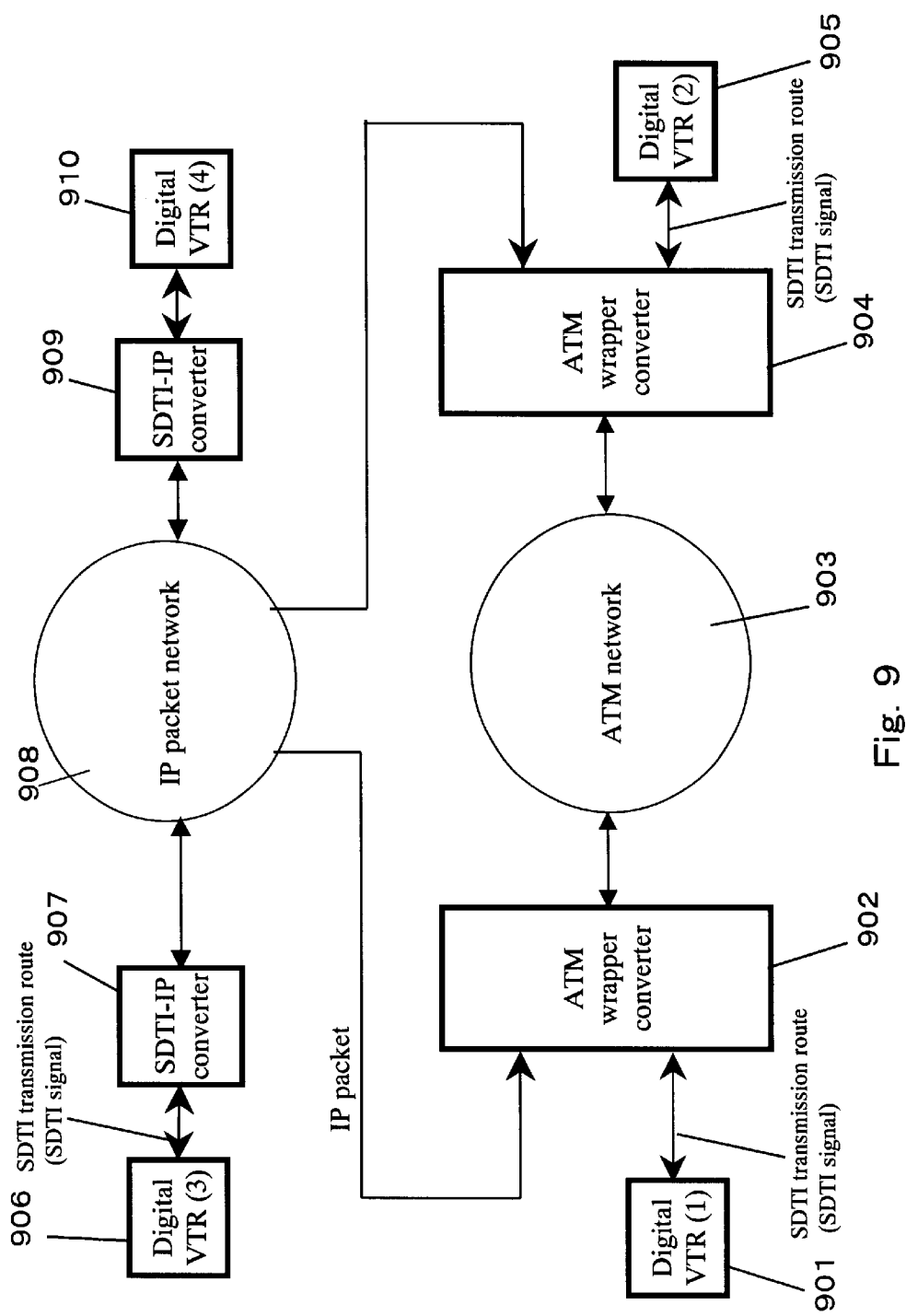
FIG. 9 is an explanatory diagram of an example of configuration of transmission system combining ATM network and IP network.

When using the ATM wrapper converter (the configuration shown in FIG. 1) which is a combination of the SDTI-ATM converter and IP packet-ATM converter described above, an example of operation is explained by referring to FIG. 9. In FIG. 9, from a digital VTR (1) 901, an SDTI signal is transmitted to an ATM wrapper converter 902 through an SDTI transmission route. In the ATM wrapper converter 902, by the signal conversion explained in the first embodiment, an ATM wrapper transmission block is generated, and divided into ATM packets, and transmitted to an ATM wrapper converter 904 through an ATM network 903. In the ATM wrapper converter 904, from the ATM wrapper transmission packet, SDTI information and DV-based signal are restored, and converted again into an SDTI signal, and transmitted into a digital VTR (2). These signal processings are same as mentioned in the first embodiment.

In FIG. 9, further, from a digital VTR (3) 906, an SDTI signal is transmitted to an SDTI-IP converter 907 through an SDTI transmission route. In the SDTI-IP converter 907, by the same signal conversion as at the transmission side in the first embodiment, an ATM wrapper transmission block is generated. Then, in the SDTI-IP converter 907, the ATM wrapper transmission block is converted into an IP packet in the same manner as at the reception side in the second embodiment. This IP packet is transmitted to an SDTI-IP converter 909 through an IP packet network 908, such as existing IP (IPv4) network, IP network supporting IPv6, or IP network supporting IP over WDM, which may be used either alone or in combination, and it is processed reversely to the process in the SDTI-IP converter 907, and the SDTI signal is transmitted into a digital VTR (4). Or, processing reversely to the case above, in FIG. 9, from the digital VTR (4) 910, it may be transmitted to the digital VTR (3) 906 through the IP network 908.

Further in FIG. 9, alternatively, if the IP packet issued from the SDTI-IP converter 907 is put into the ATM wrapper converter 902 through the IP packet network 908, converted into an ATM packet, and put into the ATM wrapper converter 904 through the ATM network 903, similarly, this ATM wrapper converter can convert the packets effectively by a small conversion overhead, among the SDTI signal, IP packet, and ATM packet. The SDTI signal delivered from the ATM wrapper converter 904 is transmitted to the digital VTR. Moreover, the IP packet which is the output of the ATM wrapper converter 904 can be transmitted to the SDTI-IP converter 909 through the IP packet network 908, and transmitted to the digital VTR (4) 910. In FIG. 9, still more, from the digital VTR (1) 901, digital VTR (2) 905, digital VTR (3) 906, and digital VTR (4) 910, it is also possible to transmit into each arbitrary digital VTR direction through the ATM network 903 and IP network 908.

(Third Embodiment)

Referring back to FIG. 1, a third embodiment of the invention is explained. FIG. 1 is a block diagram showing a schematic configuration of a communication apparatus of the present invention. In FIG. 1, reference numeral 101 is an ATM wrapper converter. In FIG. 1, an SDTI signal using a DV-based signal is entered in a buffer 102. Similarly, an IP packet signal using DV-based signal is entered in a buffer 103.

The SDTI signal entering the buffer 102 is sent into an SDTI information extracting and building unit 105 by way of a buffer/selector 104, and the SDTI information is extracted. Further, the SDTI signal entering the buffer 102 is sent into a DV-based data extracting and building unit 106 by way of the buffer/selector 104, and the DV-based signal is extracted.

The SDTI information extracted in the SDTI information extracting and building unit 105 is information of 50 bytes as shown in FIG. 2, same as in the first embodiment. The 25 Mbps compressed DV-based signal extracted in the DV-based data extracting and building unit 106 is also same as in the first embodiment as shown in FIG. 3.

In FIG. 1, in the ATM wrapper generator, the SDTI information and DV-based signal entered from the units 105 and 106 are converted into the ATM wrapper transmission block by the protocol processing shown in FIG. 4 same as explained in the first embodiment.

In the first embodiment, this ATM wrapper transmission block is sent to the AAL1 processor 110, and is converted into an ATM packet according to the process defined in the ITU-TI363.1, and then sent out into the ATM network.

In this embodiment, in FIG. 1, the ATM wrapper transmission block is further sent into the clock reproduction processor 111, where a time stamp and a sync pattern are added, then it is further sent into the error compensation processor 112 to undergo FEC processing or interleaving processing as mentioned in the document cited above, and is converted into an ATM packet conforming to AAL5 protocol by AAL5 processing specified in ITU-TI363.5, and is sent out into the ATM network. After the ATM packet of the AAL5 system received in the SDTI-ATM converter 504 through the ATM network is accumulated in the buffer with a proper quantity for FEC processing, the error is corrected by the FEC. After error correction, on the basis of the clock information such as time stamp transmitted further, the clock of the transmission side (terminal) is reproduced at the reception side (terminal). As a result, if the AAL5 system is employed, error-free data can be transmitted without suffering from effects of bit error or cell loss of the ATM network. At the same time, the transmission side and reception side can be synchronized.

Also in the case of the AAL5 system, in the SDTI-ATM converter 504, the SDTI information and DV-based signal are restored from the ATM wrapper transmission packet, and converted again into an SDTI signal, and transmitted to the digital VTR (2). These signal processings are reverse converting processes of the process in the SDTI-ATM converter 502 in terms of logic function. In stationary transmission state, since the SDTI information is a fixed pattern, the signal processing delay in the SDTI-ATM converter is very small.

Figure 10:
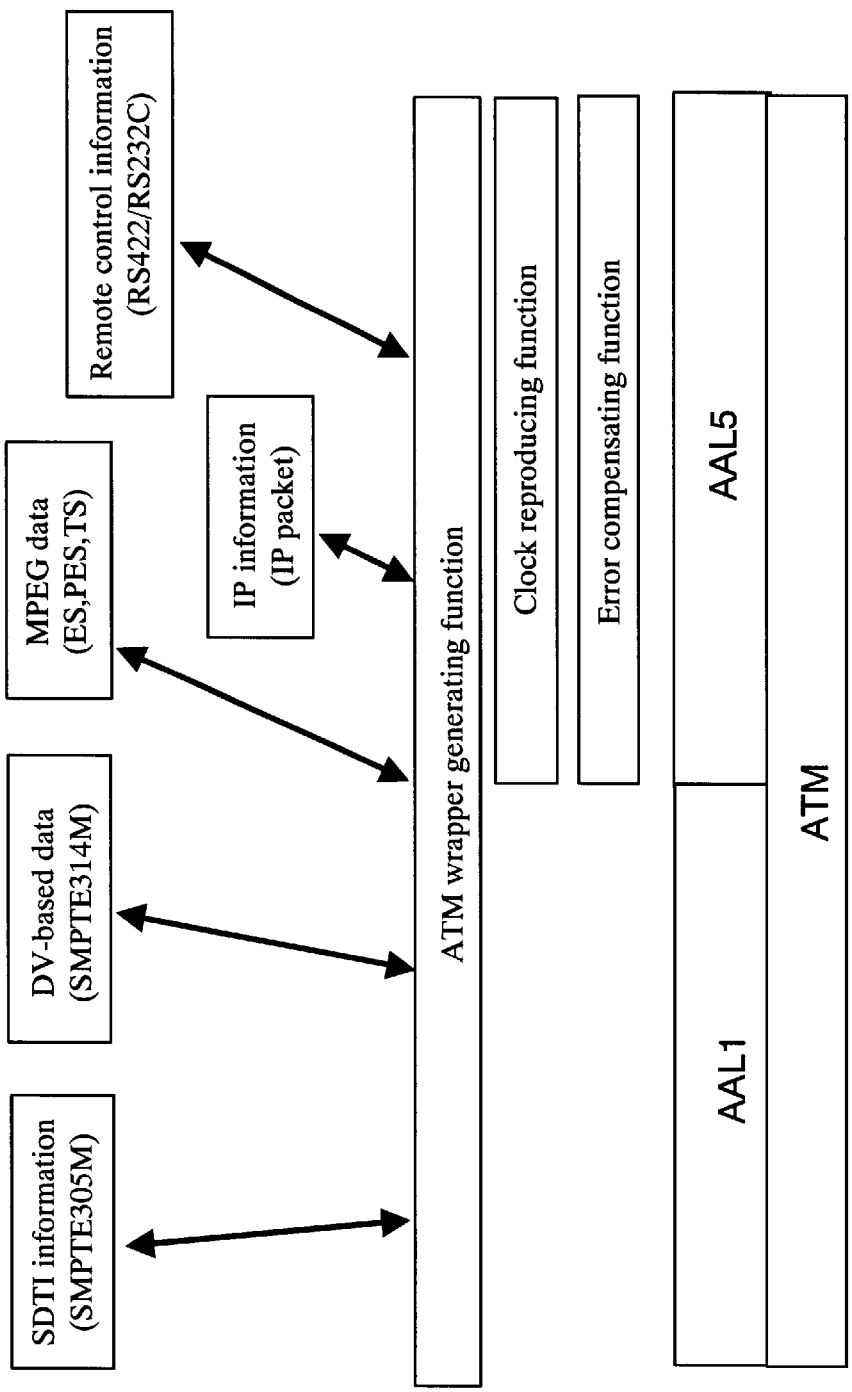
FIG. 10 is an explanatory diagram of protocol of ATM transmission apparatus using ATM wrapper-transmission block.

FIG. 10 is a hierarchical expression of the above protocol processing. The data payload to be transmitted includes DV-based data (conforming to SMPTE 314M), SDTI information (conforming to SMPTE 305M), IP information (conforming to IP packet standard), IEEE1393 information (that is, transmission data extracting and combining effective data such as isochronous packet and asynchronous packet relating to the IEEE1394 specified in the IEC61883 standard), remote control information (conforming to Odetics, Lauth, and other RS422 control signal), and MPEG data (stream of ES, PES, TS, etc.), which are assembled into a single ATM wrapper transmission block by using the ATM wrapper generating function, and transmitted by the AAL1 system. Or it is transmitted by the AAL5 system by adding the clock reproduction function and error compensation function to the ATM wrapper transmission block.

(Fourth Embodiment)

Figure 11:
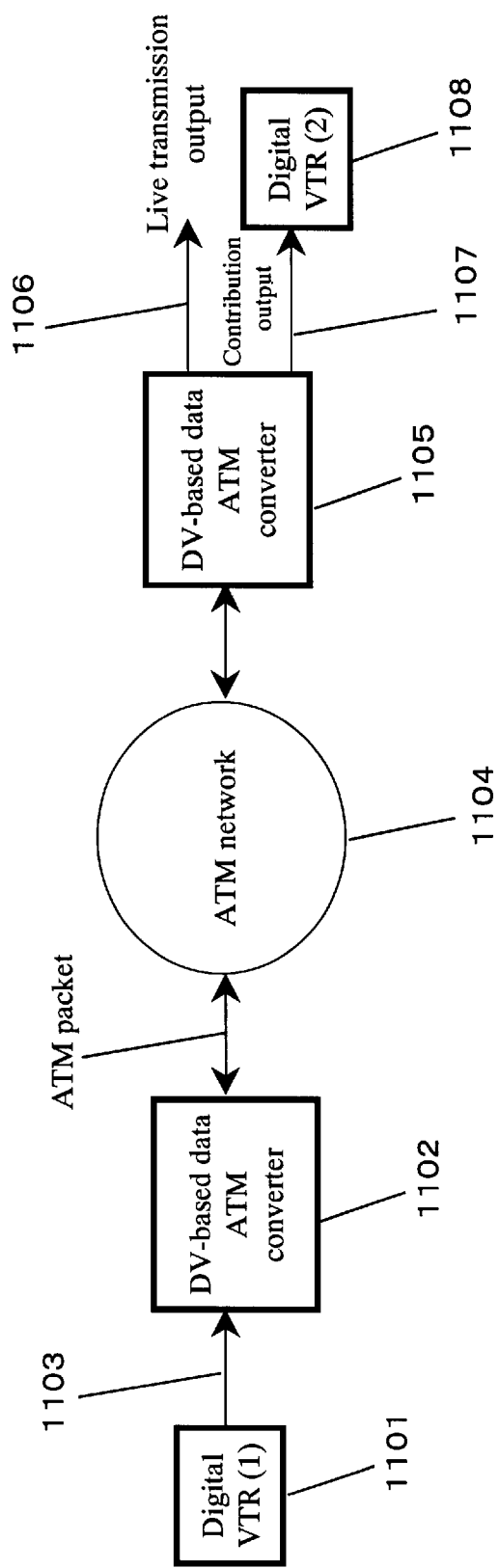
FIG. 11 is an explanatory diagram of concept of operation of communication apparatus in a fourth embodiment.

FIG. 11 is a conceptual diagram of a fourth embodiment of the invention. A live broadcast program of sports, concert or news is entered in a digital VTR (1) 1101. The VTR converts the input into DV-based data, records it, and also converts into a stream of DV-based data, and feeds it into a DV-based data ATM converter 1102 through an IEEE1394 transmission route 1103. In the DV-based data ATM converter 1102, DV-based data is extracted from the entered IEEE1394 stream, and converts into an ATM cell. The ATM cell is transmitted to a DV-based data ATM converter 1105 through an ATM network 1104. In the DV-based data ATM converter 1105, the received ATM cell is restored into DV-based data. Herein, the output of the DV-based data ATM converter 1105 is composed of two systems, one is a live transmission output 1106 and other is a contribution output 1107.

The live transmission output 1106 is minimum in the transmission time from the input of the DV-based data ATM converter 1102 until the output of the DV-based data ATM converter 1105, and the transmission error is replaced (concealed) by a preceding frame signal or the like. That is, although the presence of error in the reception output is allowed, the transmission and reception processing time is short, and it is suited to exchange or real-time talk in two-way communication between two terminals. The contribution output involves a delay until reception output, but error in reception output is compensated by re-send.

Figure 12:
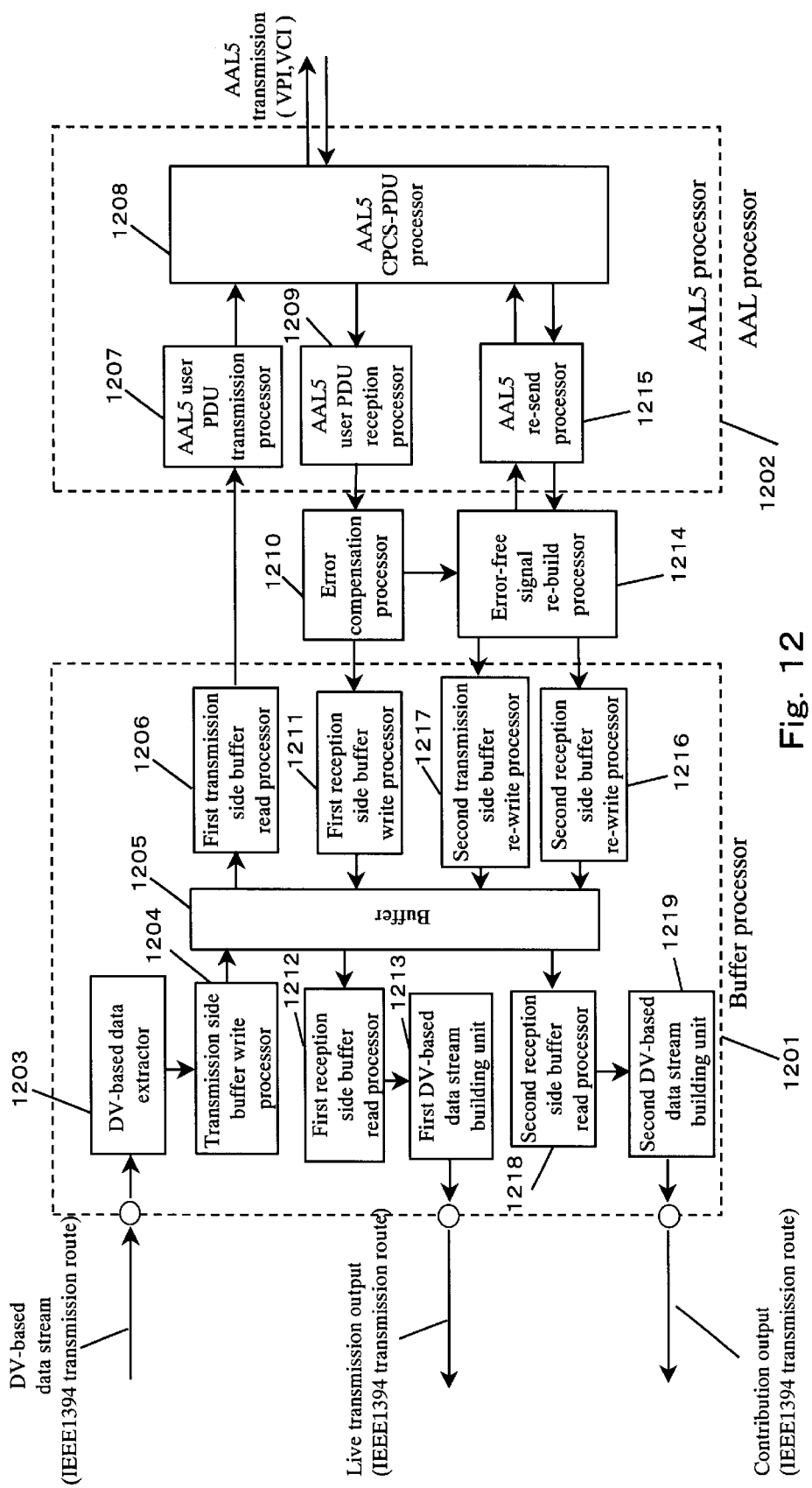
FIG. 12 is an explanatory diagram of configuration of transmission and reception terminals in the fourth embodiment.

FIG. 12 is an explanatory diagram of configuration of the communication apparatus of this embodiment. FIG. 12 is a specific block diagram of the DV-based data ATM converter 1102 in FIG. 11. First, the operation at the transmission side is explained. In FIG. 12, reference numeral 1201 is a buffer processor, and 1202 is an AAL5 processor.

In FIG. 12, an IEEE1394 stream of DV-based signal is put into a DV-based data extractor 1203. The IEEE1394 stream entering the extractor 1203 extracts the DV-based data, and sends it into a transmission side buffer write processor 1204. The transmission side buffer write processor 1204 receives the output of the DV-based data extractor, and writes into the transmission signal write region of the buffer 1205. There is also a transmission side buffer read processor 1206 for reading out the DV-based data from the buffer.

FIG. 3 shows a 25 Mbps compressed DV-based signal extracted in the DV-based data extractor 1203, which is also known as DIF signal. The signal in FIG. 3 is explained in the SMPTE standard 314M. The DIF block signal (80 bytes) shown in FIG. 3 is cut out by 20 pieces (1600 bytes each), and transmitted as payload of one PDU.

Figure 13:
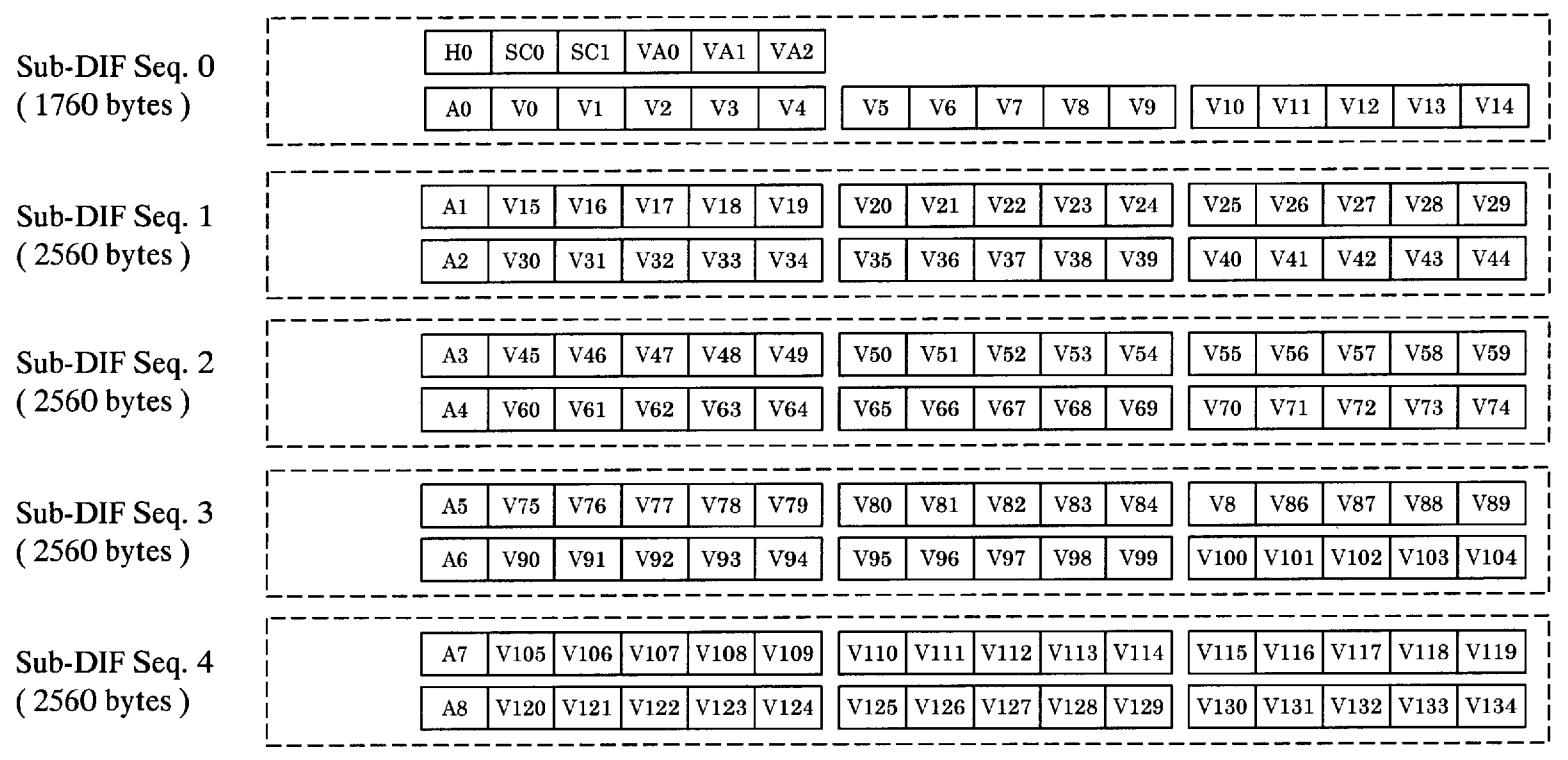
Figure 14:
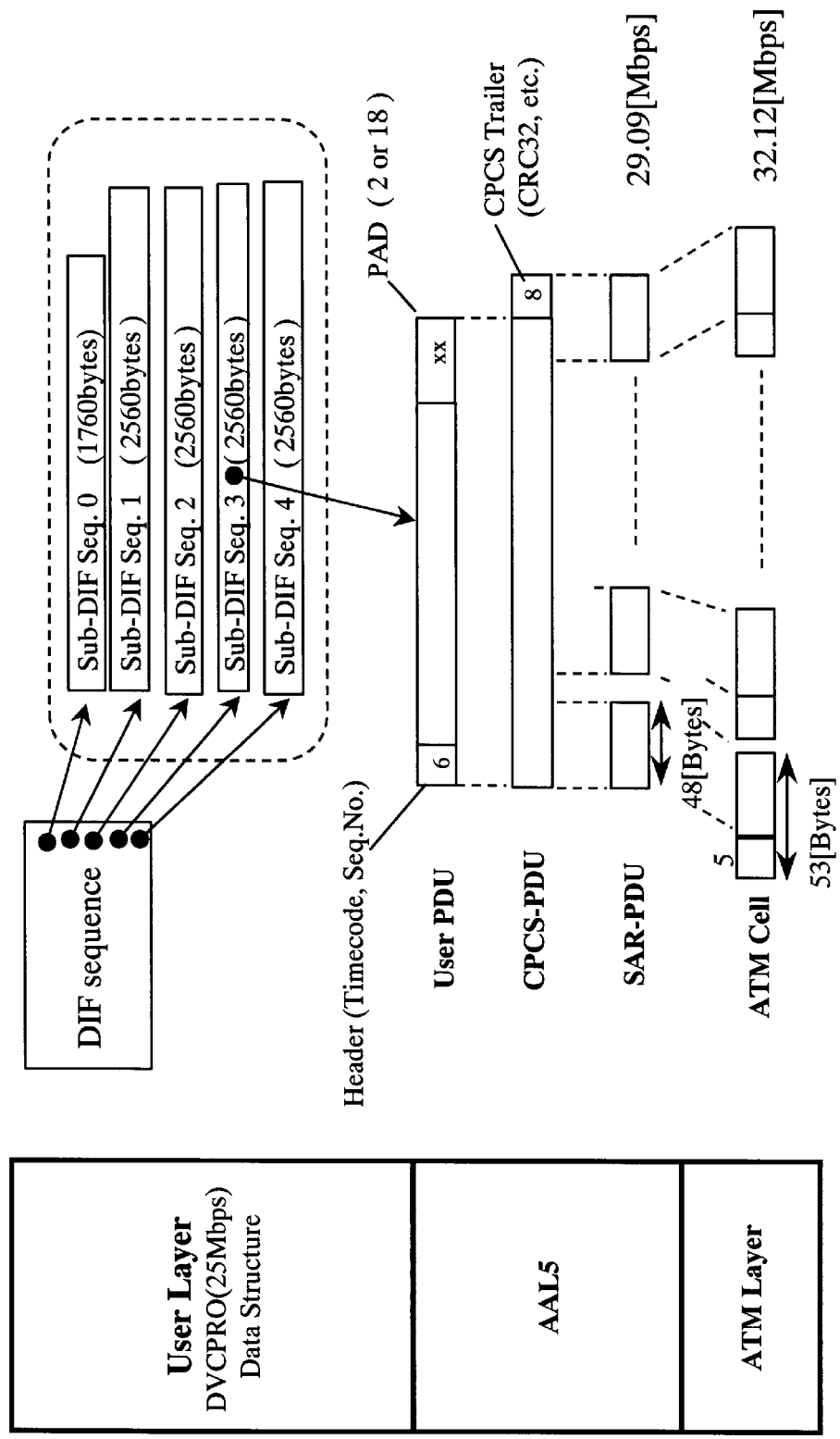
FIG. 14 is an explanatory diagram of protocol layer of transmission by Native ATM system.
Figure 15:
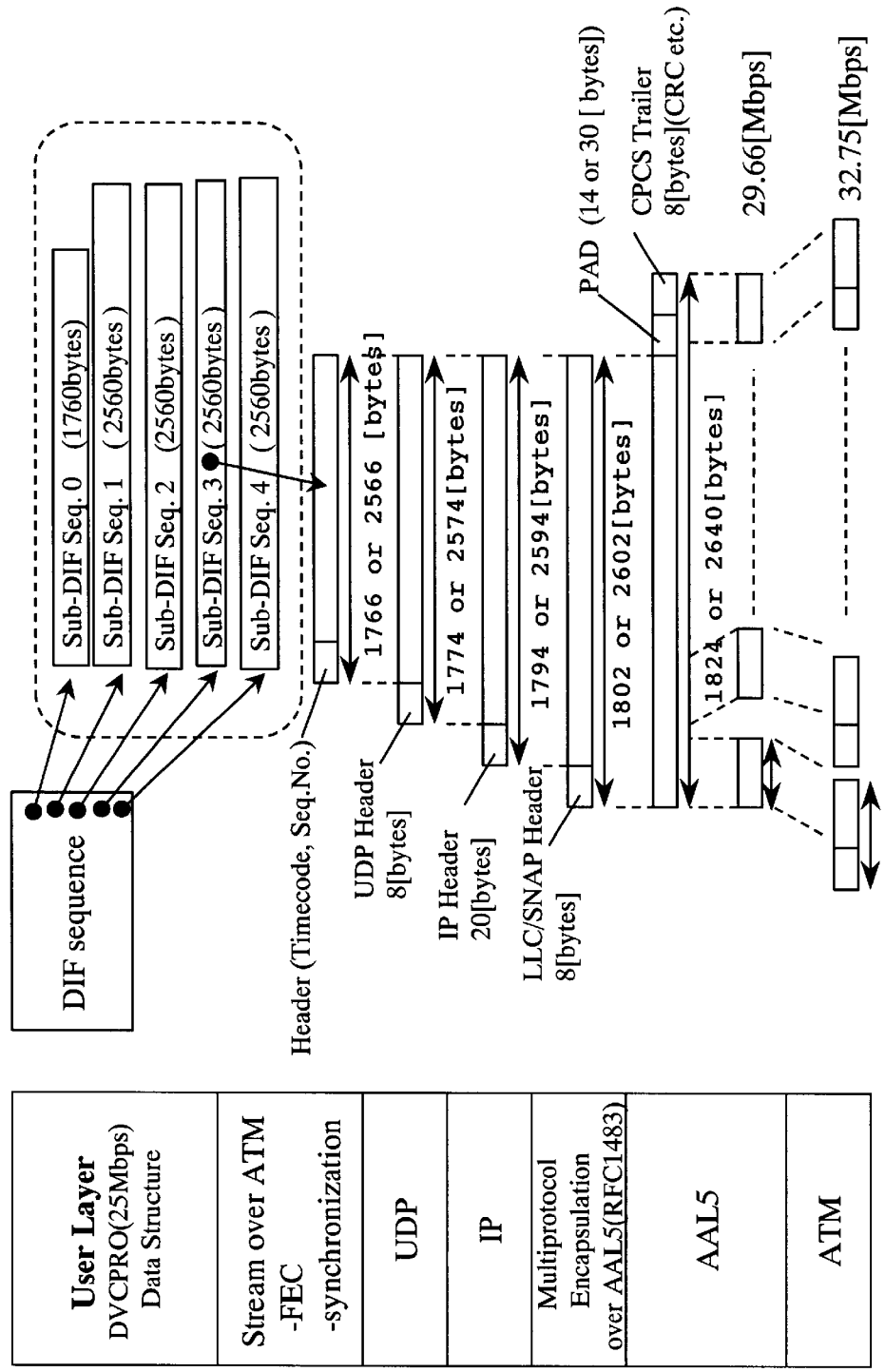
FIG. 15 is an explanatory diagram of protocol layer of transmission by UDP/IP system.

The transmission side buffer read processor 1206 sends the data in the sub-DIF sequence unit shown in FIG. 13 to an AAL5 user PDU transmission processor 1207. The AAL5 user PDU transmission processor 1207 converts the data into user PDU data, and sends it to an AAL5 CPCS-PDU processor 1208. Then the AAL5 CPCS-PDU processor 1208 converts it into an ATM cell of AAL5 format, and sends it out to the ATM network specified by a specific virtual path (VP) or virtual channel (VC) designated preliminarily. FIG. 14 shows an example of conversion process from DIF signal to ATM cell in the case of Native ATM system transmission using AAL5. FIG. 15 shows an example of conversion process from DIF signal to ATM cell in the case of UDP/IP system transmission using AAL5.

The operation at the reception side is explained. In FIG. 12, the AAL5 CPCS-PDU processor1208 receives the ATM cell transmitted through the ATM network, and builds up a CPCS-PDU from the ATM cell. This building process refers to FIG. 14 and FIG. 15, and is described in the ITU-TI363.5 standard and others. An AAL5 user PDU reception processor 1209 receives the re-built PDU data and error flag output, and puts into an error compensation processor 1210. The error compensation processor 1210 receives the reception PDU data and error flag output, specifies the error, compensates the data by concealing with frame data of high correlation such as preceding frame relating to the discarded PDU or the like, and transfers the compensated data to a first reception side buffer write processor 1211. Herein, the data is concealed in the frame unit. The first reception side buffer write processor 1211 writes continuous sub-DIF sequence data compensated for error into the buffer 1205. The continuous frame data compensated for error is re-organized from the PDU data, being based on FIG. 14 and FIG. 15.

Next, a first reception side buffer read processor 1212 immediately reads out the DIF base frame data written into the buffer 1205 by the first reception side buffer write processor 1211, sends it to a first DV-based data stream building unit 1213, in which it is converted into a data stream for live transmission of low delay type, and a live transmission output is sent through an IEEE1394 transmission route.

The construction of the contribution output is explained.

The error compensation processor 1210 receives the reception PDU data and error flag output, specifies the error frame, and sends specific information relating to error PDU to an error-free signal re-build processor 1214 in order to re-send all frame data relating to the discarded PDU. Now, an AAL5 re-send processor 1215 at the reception side terminal, using TCP protocol, requests re-send of error to the transmission side terminal through the AAL5 CPCS-PDU processor 1208. Herein, the resend protocol may be other known re-send protocol such as SSCOP. At the transmission side terminal, according to the request received from the AAL5 re-send processor, all sub-DIF sequence block data including all of the frames having transmission error in the second transmission side buffer read processor through the error-free signal re-build processor 1214 are read out, and re-sent to the reception side terminal. The re-send occurrence frequency in a general ATM network is as mentioned above, that is, one error PDU transmission in about one million PDUs.

At the reception side terminal, when an error-free frame signal is re-built from the PDU data re-sent to the error-free signal re-build processor 1214, it is sent to a second reception side write processor 1216, in which the error-free signal is overwritten in a block signal region including an error of the buffer 205, and the error in the buffer is replaced with correct data. As a result, all reception data are correct data, and hence can be used as the contribution output which requires more correct data. A second reception side read processor 1218 reads out the error-free signal in the buffer 1205, and contribution data stream of error-free type is issued from a second DV-based data stream building unit 1219 through an IEEE1394 transmission route.

Thus, according to the embodiment, employing the AAL5 system, live contribution output of minimum transmission delay and error-free contribution output can be presented at the same time.

(Fifth Embodiment)

A fifth embodiment is explained below while referring to FIG. 12. What differs from the fourth embodiment is the error data re-send process in order to obtain the output for contribution. More specifically, a transmission side buffer read processor 1204 writes the DV-based data into a transmission signal write region of the buffer 1205 by a specific rule, or reads out from the buffer by a specific rule.

The specific writing rule is explained. The DIF block signal shown in FIG. 3 is sub-divided into data in sub-DIF sequence units shown in FIG. 13. The sub-divided periodic data block is sent into an AAL5 user PDU send processor 1207.

By dividing the PDU data into periodic sub-blocks in the video frame, the conceal process can be simplified. In terms of probability, for example, if bit errors are present in the DIF block of a same DIF block number continuously in two frames at the reception side, it is enough to replace the sub-block of the same difference merely from the beginning of the frame, so that error processing is simplified. In the first embodiment, it is required to re-send all data in one frame, but it is enough to re-send only sub-DIF sequence data in the present embodiment.

The operation at the reception side is explained. The process for obtaining live transmission output is nearly same as in the fourth embodiment, but in the preceding embodiment, the error compensation processor 1210 receives the reception PDU data and error flag output, specifies the error, and compensates, the data in the entire preceding frame high in correlation to the discarded PDU, but in this embodiment, the data is compensated by concealing with the sub-block data of the preceding frame having a high correlation to the discarded PDU. The compensated data is transferred to the first reception side buffer write processor 1211. The first reception side buffer write processor 1211 writes continuous sub-DIF sequence data compensated for error into the buffer 1205. The continuous sub-DIF sequence data compensated for error is re-organized from the PDU data on the basis of FIG. 14 and FIG. 15, and is thereafter converted into the data stream for live transmission same as in the fourth embodiment, and a live transmission output is sent out through the IEEE1394 transmission route.

In this embodiment, the sub-DIF sequence is defined as shown in FIG. 13, using it as the payload of one PDU, the conceal process at the reception side is done efficiently, so that the reception error may be less obvious.

The construction of the contribution output is explained. The error compensation processor 1210 receives the reception PDU data and error flag output, specifies the error, and sends specific information about the error PDU to the error-free signal re-build processor 1214 in order to re-send the discarded PDU. The AAL5 re-send processor 1215 at the reception side terminal, using TCP protocol, requests re-send of error to the transmission side terminal through the AAL5 CPCS-PDU processor 1208. Herein, the re-send protocol may be other known re-send protocol such as SSCOP. At the transmission side terminal, according to the request received from the AAL5 re-send processor, sub-DIF sequence block data of transmission error in the second transmission side buffer read processor through the error-free signal re-building unit 1214 is read out, and re-sent to the reception side terminal.

At the reception side terminal, when an error-free signal is re-built from the PDU data re-sent to the error-free signal re-build processor 1214, it is sent to a second reception side write processor 1216, in which the error-free signal is overwritten in a block signal region including an error of the buffer 1205, and the error in the buffer is replaced with correct data. As a result, all reception data are correct data, and hence can be used as the contribution output which requires more correct data. A second reception side buffer read processor 1218 reads out the error-free signal in the buffer 1205, and contribution data stream of error-free type is issued from a second DV-based data stream building unit 1219 through an IEEE1394 transmission route.

Thus, according to the embodiment, by dividing the PDU data into periodic sub-blocks in the video frame, the conceal process at the time of occurrence of transmission error can be simplified. Moreover, since the transmission data is reduced in size, the image quality after concealing can be enhanced.

(Sixth Embodiment)

A sixth embodiment is explained by referring to FIG. 12. What this embodiment differs from the fourth and fifth embodiments lies in the efficient re-send process of error data for obtaining the contribution output.

More specifically, the a transmission side buffer write processor 1204 writes at least one of the sequence number and time code, and the DV-based data in a transmission signal write region of a buffer 1205 according to a specific rule, or reads out from the buffer by a specific rule.

The sequence number is explained by using FIG. 16. In this diagram, the DIF block signal of one frame shown in FIG. 3 is divided into data of five sub-DIF sequence units. Every sub-DIF sequence is identified with a sequence number. A periodic data block which is a combination of this sequence number and DIF block shown in FIG. 16 is sent to an AAL5 user PDU transmission processor 1207.

The PDU data is divided into periodic sub-blocks in the video frame, and identified with sequence number, so that re-send process and conceal process can be done efficiently.

Figure 17:
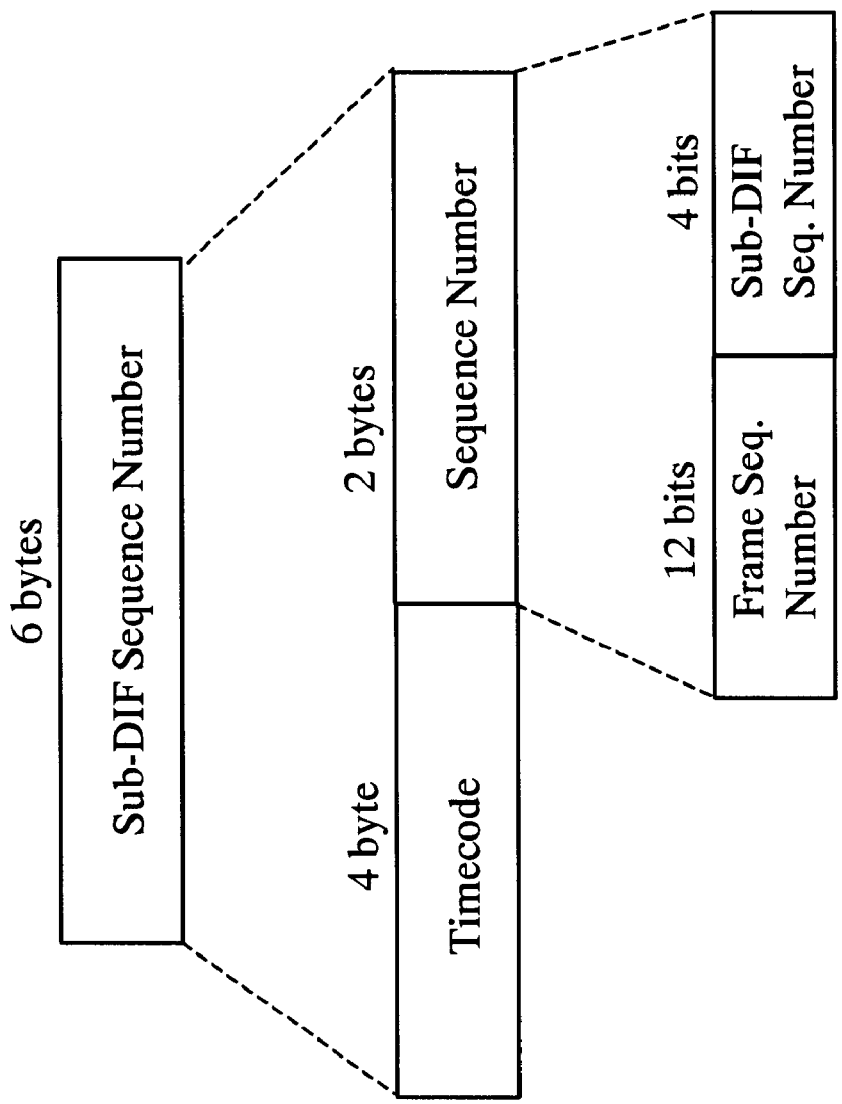
FIG. 17 is a diagram showing an example of composition of sequence number.

An example of sub-DIF sequence number given to the sub-DIF sequence is shown in FIG. 17. The sub-DIF sequence number consists of 4 bytes of time code and 2 bytes of sequence number. The 2-byte sequence number consists of 12 bits of frame sequence number, and 4 bits of sub-DIF sequence number. By using the time code and sequence number, detection of error PDU, conceal, and re-send process become more efficient as explained below.

Figure 18:
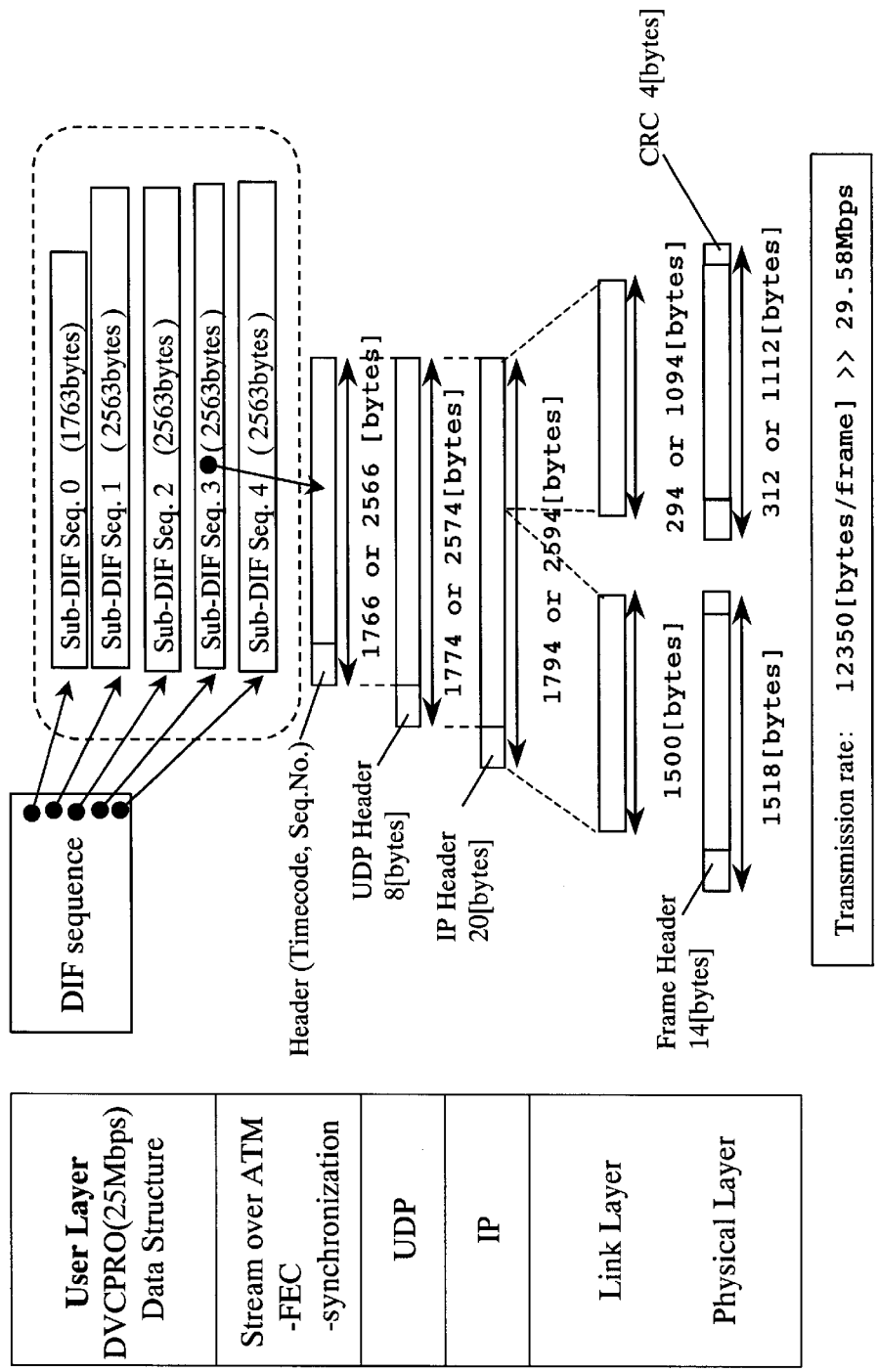
FIG. 18 is an explanatory diagram of protocol layer of transmission by UDP/IP system assigned with sequence number.

The operation at the reception side is going to be described. The AAL5 CPCS-PDU processor 1208 receives an ATM cell transmitted through the ATM network, a CPCS-PDU is made from the ATM cell. This building process is shown in FIG. 18. It is also mentioned in the ITU-TI363.5 standard, etc. Consequently, the AAL5 user PDU reception processor 1209 feeds the re-built PDU data and error flag output into the error compensation processor 1210. The error compensation processor 1210 receives the reception PDU data and error flag output, specifies the error, compensates the data by concealing with the sub-block data of the preceding frame high in correlation to the discarded PDU, and transfers the compensated data to the first reception side buffer write processor 1211. The first reception side buffer write processor 1211 write the continuous sub-DIF sequence data compensated for error into the buffer 1205. This continuous sub-DIF sequence data compensated for error has been re-built from the PDU data by referring to the procedure shown in FIG. 9. Thereafter, same as in the fourth embodiment, a data stream for live transmission is issued.

As described herein, the DIF block in FIG. 3 is shuffled by extracting one frame, and the sequence number is added as shown in FIG. 16, and thus the sub-DIF sequence is defined and used as the payload of one PDU, and thus by concealing at the reception side efficiently, the reception error becomes less obvious.

The construction of the contribution output is explained. The error compensation processor 1210 receives the reception PDU data and error flag output, specifies the error, and sends the sequence number as specific information about the error PDU to the error-free signal re-build processor 1214 in order to re-send the discarded PDU. The AAL5 re-send processor 1215 at the reception side terminal, using the TCP protocol, requests re-send of error to the transmission side terminal through the AAL5 CPCS-PDU processor 1208. Herein, the re-send protocol may be other known re-send protocol such as SSCOP. At the transmission side terminal, according to the request received from the AAL5 re-send processor, the second transmission side buffer read processor reads out the sub-DIF sequence block data becoming a transmission error through the error-free signal re-build processor 1214 is read out, and re-send it to the reception side terminal.

At the reception side terminal, when an error-free signal is re-built from the PDU data re-sent to the error-free signal re-build processor 1214, it is sent to the second reception side write processor 1216, in which the error-free signal is overwritten in a block signal region including an error of the buffer 1205, and the error in the buffer is replaced with correct data. As a result, all reception data are correct data, and hence can be used as the contribution output which requires more correct data. The second reception side buffer read processor 1218 reads out the error-free signal in the buffer 1205, and contribution data stream of error-free type is issued from the second DV-based data stream building unit 1219.

Thus, according to the embodiment, by dividing the PDU data into periodic sub-blocks in the video frame, and further adding the sequence number, the re-send process and conceal process can be executed more efficiently.

(Seventh Embodiment)

A seventh embodiment is explained by referring to FIG. 2. The seventh embodiment is intended to transmit the audio data in duplex in order to enhance error resistance of audio. In the seventh embodiment, for example, the sub-DIF sequence block is composed as shown in FIG. 19. In FIG. 19, the DIF block relating to audio is deviated from the original position by 2 sub-DIF sequences, and is placed before the DIF data block. If two PDUs are discarded consecutively, continuous audio without muting can be transmitted to a remote place.

Figure 20:
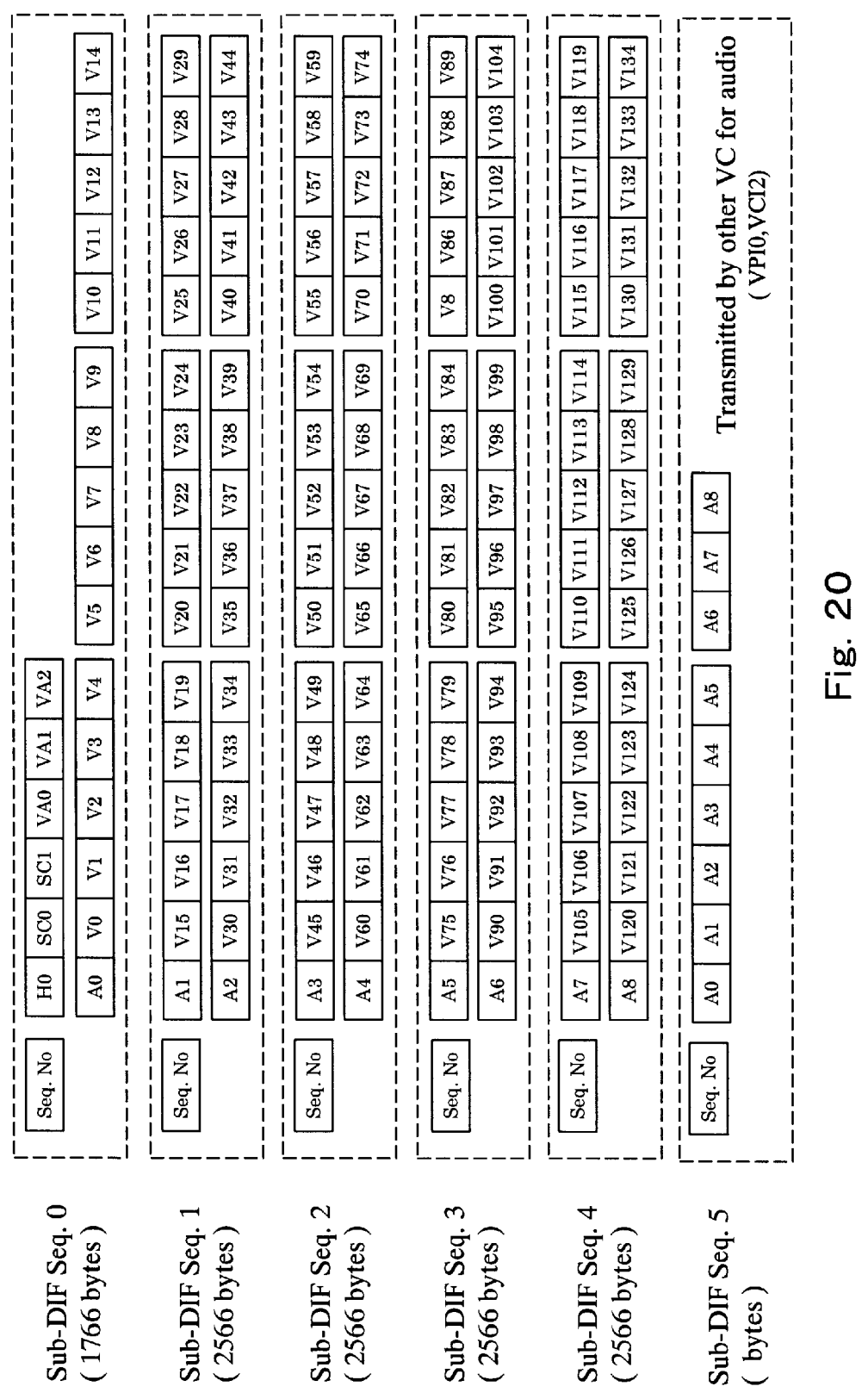

In the case of AAL5, if an error occurs in the PDU boundary, two PDUs are discarded, and it is hence effective to place the audio DIF block by deviating a distance of two sub-DIF sequences from the original position as shown in FIG. 19. Similarly, as shown in FIG. 20, a sub-DIF sequence block exclusive for audio may be selected.

Thus, according to the embodiment, by transmitting audio data in duplex, the error resistance of audio transmission can be enhanced.

(Eighth Embodiment)

Figure 21:
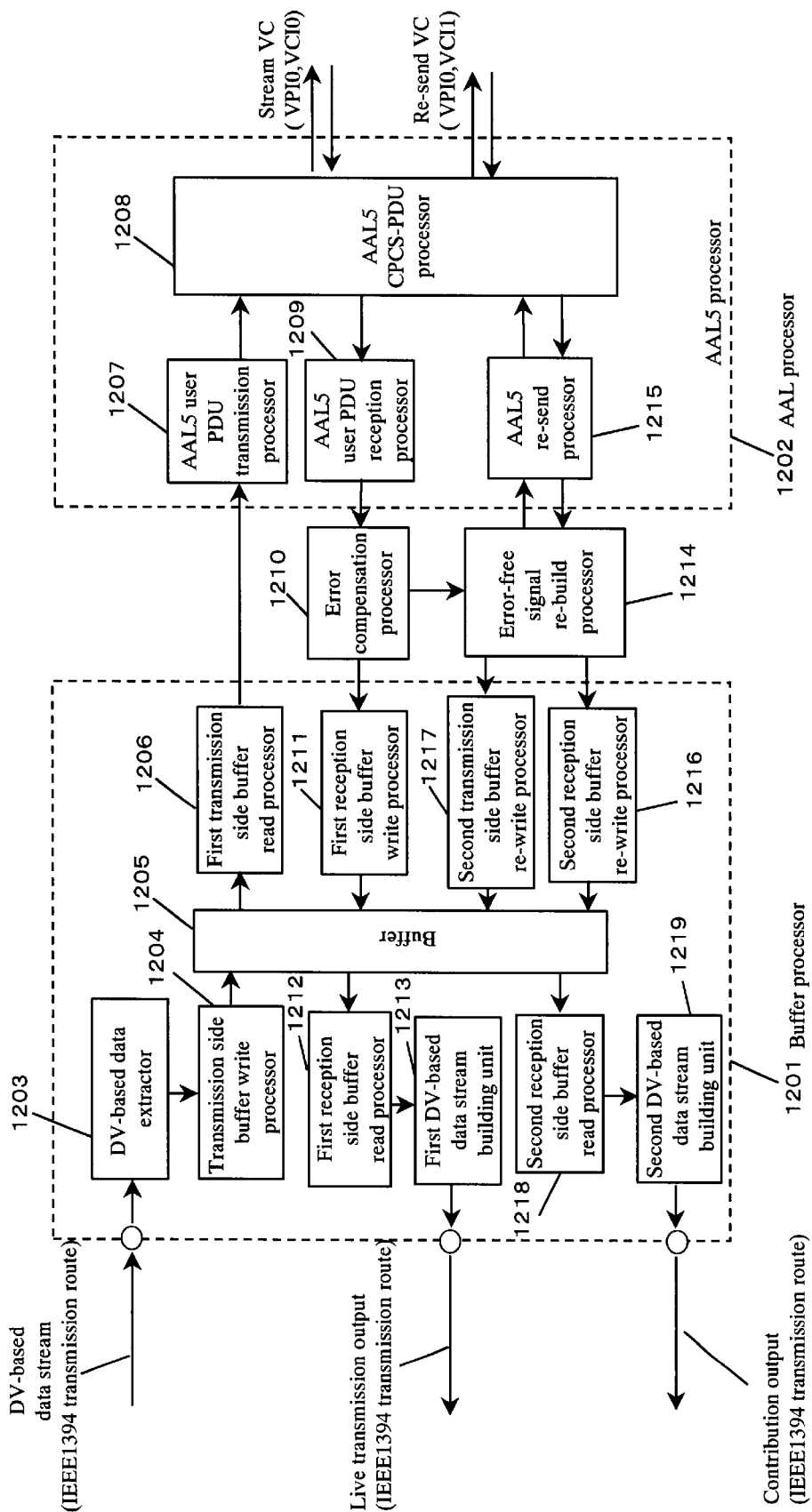
FIG. 21 is an explanatory diagram of configuration of transmission and reception terminals when provided with an exclusive VC for re-send.

An eighth embodiment is explained by referring to FIG. 21. The eighth embodiment is intended to set an exclusive virtual channel for re-send. As a result, without suffering from effects of re-send data traffic such as TCP/IP occurring as burst-like phenomenon, a stream of stable DV-based data can be transmitted. FIG. 21 is same as the first embodiment except for transmission and reception of ATM cell through the ATM network. In FIG. 21, from the AAL5 CPCS-PDU processor, the stream is transmitted to the reception side through the VC exclusive for stream, (VP, VC)=(VP0, VC0). The data to be re-sent is transmitted through the VC exclusive for re-send, (VP, VC)=(VP0, VC1).

At the ATM, the PCR (peak cell rate) is preset, but when the VC for stream transmission and the VC for burst-like data transmission are assembled into one, at the moment of sudden increase of burst transmission traffic, if the PCR exceeds the PCR value being monitored by the network, the cell may be discarded by the network management mechanism. If discard occurs, re-send occurs, which may lead to a new discard and breakdown of transmission. This discard can be prevented by dividing the VC.

Thus, according to the embodiment, by setting an exclusive virtual channel for re-send, the stream can be transmitted stably without having effects of burst-like re-send data traffic.

(Ninth Embodiment)

Figure 22:
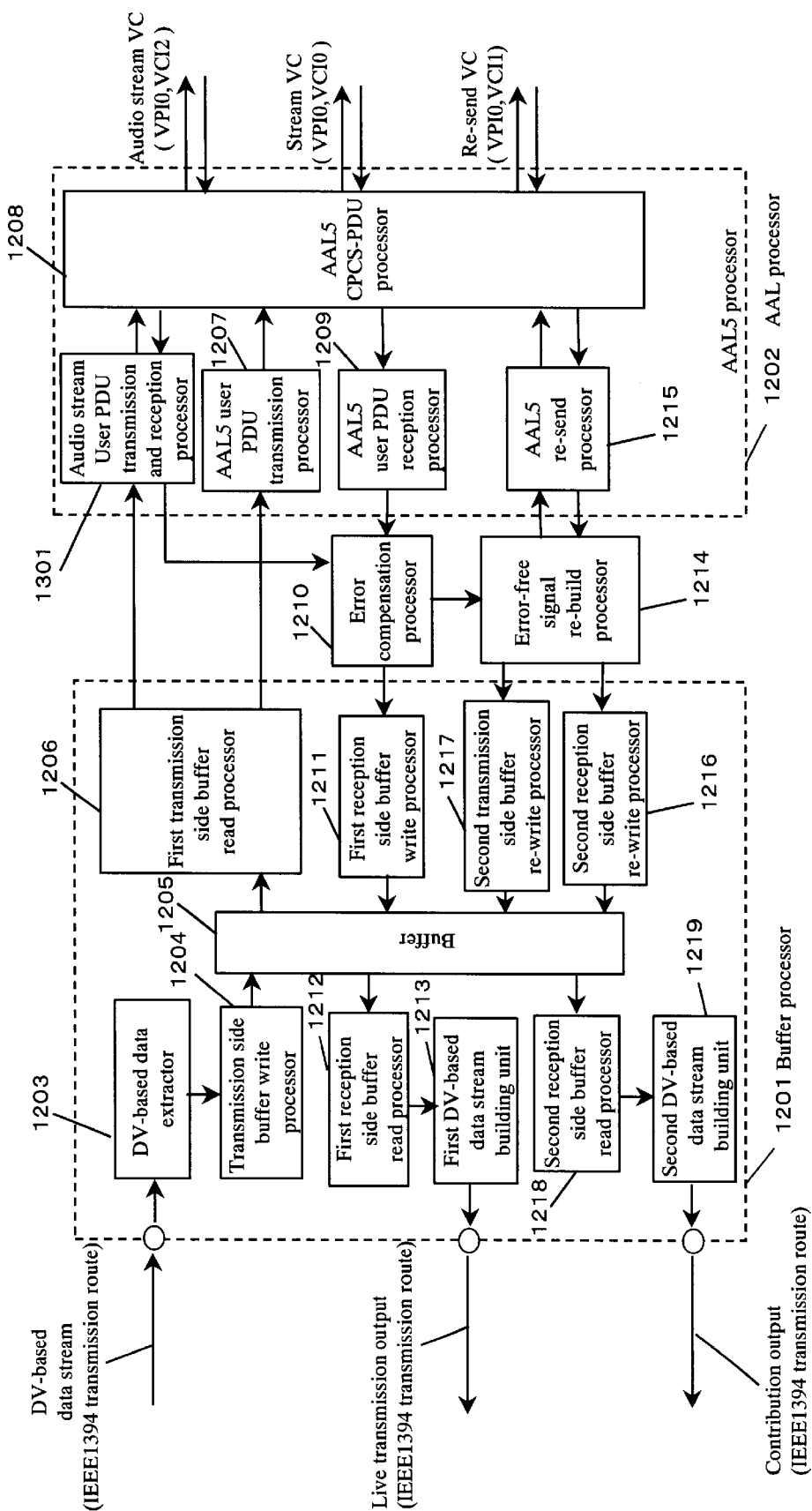
FIG. 22 is an explanatory diagram of configuration of transmission and reception terminals provided with audio exclusive stream processing.

A ninth embodiment is explained by referring to FIG. 22. The ninth embodiment is intended to transmit the audio stream data in duplex by other VC than the DIF-based data stream in order to enhance the error resistance of audio. As a result, without suffering from effects of re-send data traffic such as TCP/IP occurring as burst-like phenomenon, a stream of stable DV-based data can be transmitted. As an example of audio stream, the sub-DIF sequence No. 5 in FIG. 20 is used continuously in each frame.

FIG. 22 is same as the fourth embodiment except for transmission and reception of ATM cell through the ATM network. In FIG. 22, from the AAL5 CPCS-PDU processor, the stream is transmitted to the reception side through the VC exclusive for stream, (VP, VC)=(VP0, VC0). The data to be re-sent is transmitted through the VC exclusive for re-send, (VP, VC)=(VP0, VC1). Further, in this embodiment, the audio stream is transmitted through the VC exclusive for audio, (VP, VC)=(VP0, VC2).

At the ATM, the PCR (peak cell rate) is preset, but when the VC for stream transmission and the VC for burst-like data transmission are assembled into one, at the moment of sudden increase of burst transmission traffic, if the PCR exceeds the PCR value being monitored by the network, the cell may be discarded by the network management mechanism. If discard occurs, re-send occurs, which may lead to a new discard and breakdown of transmission. This discard can be prevented by dividing the VC. In particular, by setting the audio stream in other optical fiber not only logically but also physically, the error resistance is further enhanced.

Thus, according to this embodiment, the audio data can be transmitted stably without having effects of burst-like re-send data traffic, and the error resistance of audio is enhanced. In particular, it is effective because interrupted audio is difficult to hear.

(Tenth Embodiment)

Figure 23:
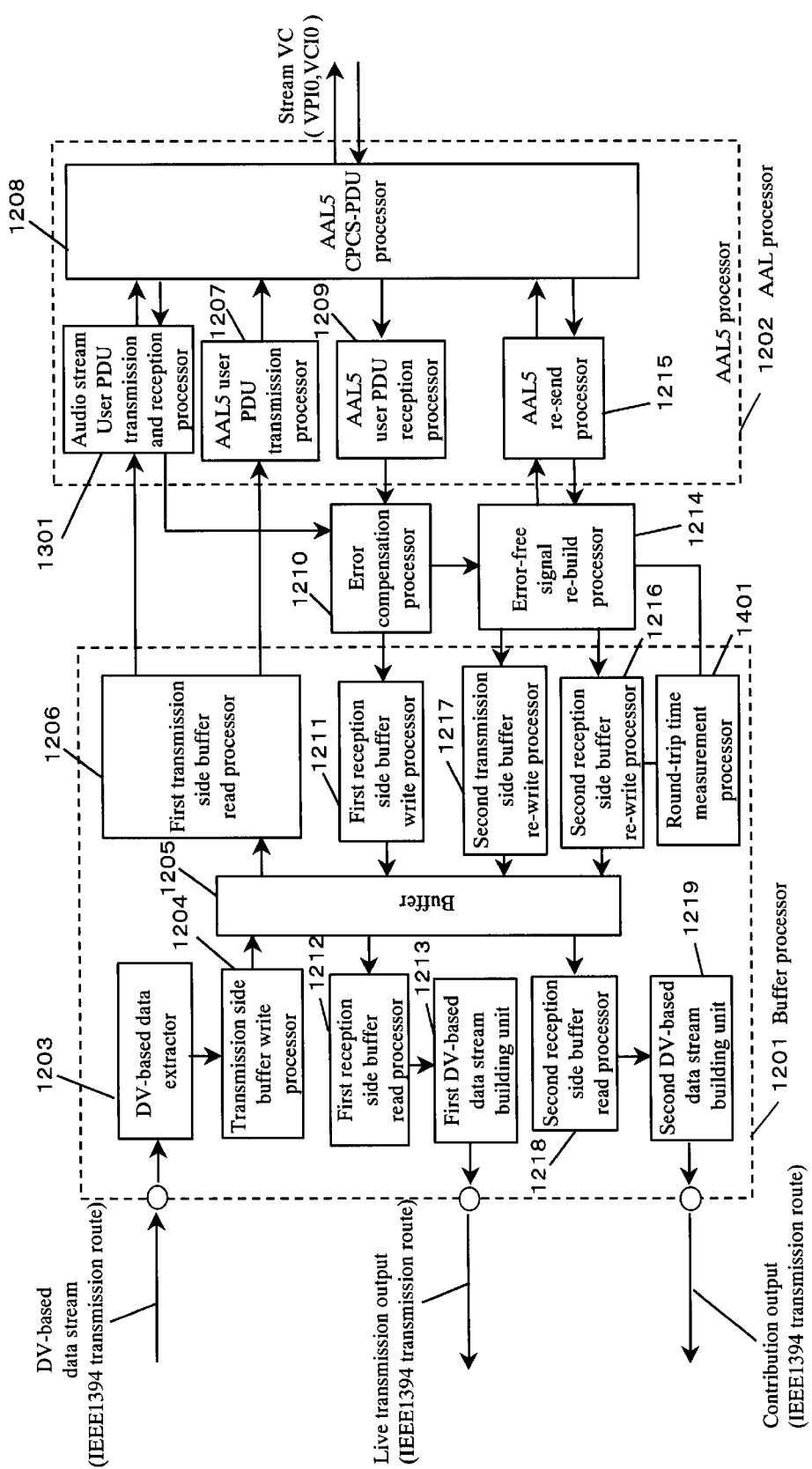
FIG. 23 is an explanatory diagram of configuration of transmission and reception terminals provided with an evaluation unit of round-trip time.

A tenth embodiment is explained by referring to FIG. 23. In FIG. 23, the process is same as in the fourth to ninth embodiments, except for the process about the round-trip time measuring processor. This embodiment comprises an evaluation unit of re-send round-trip time for determining the necessary conditions for realizing secure operation of contribution output.

Figure 24:
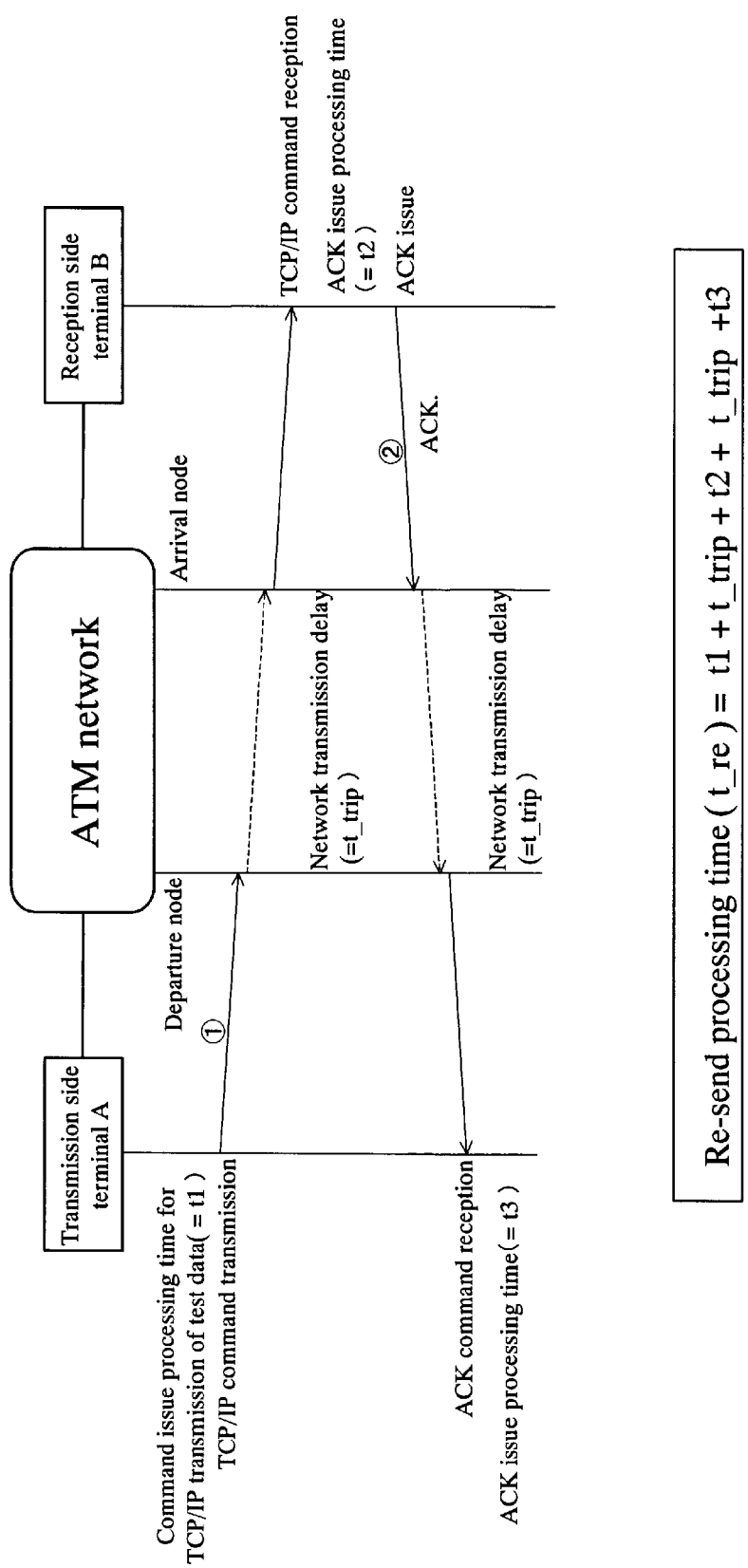
FIG. 24 is an explanatory diagram about round-trip time.

As shown in FIG. 24, the round-trip time between the transmission terminal and reception terminal is measured. In relation to the data writing timing (t_write1) into a buffer 1205 of a first reception side buffer write processor 1211, the necessary condition for reading timing (t_read2) can be determined from the buffer 1205 of a second reception side buffer read processor 1218. It is enough to give an allowance of about 10 times for the re-send processing time (t_re) in FIG. 24. That is, it is determined as:

$$(t\_read2)-(t\_write1) \approx 10 \times (t\_re).$$

As a result, in FIG. 24, it is possible to determine the construction of the buffer 1205 for assuring error-free transmission of contribution output.

Thus, according to the embodiment, by measuring the round-trip time, the buffer construction for assuring error-free transmission of contribution output can be efficiently determined.

(Eleventh Embodiment)

Figure 25:
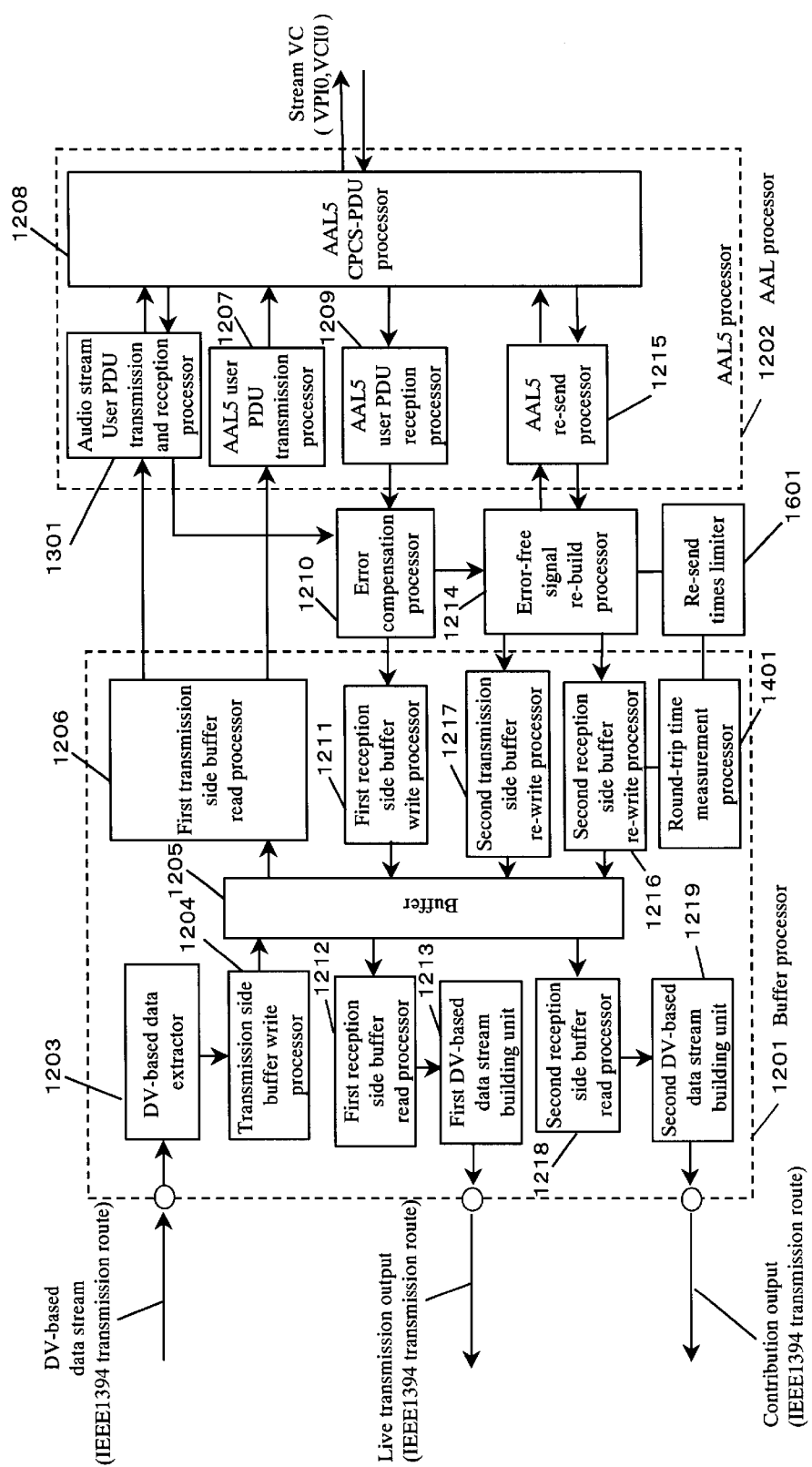
FIG. 25 is an explanatory diagram of configuration of transmission and reception terminals when limited in the number of times of re-send.

An eleventh embodiment is explained by referring to FIG. 25. In FIG. 25, the process is same as in the embodiments up to the tenth, except for the process about the re-send times limiter. This embodiment comprises a re-send times limiter in order to limit overgrowth of buffer quantity at the transmission side.

As shown in FIG. 24, the round-trip time between the transmission terminal and reception terminal is measured. In relation to the data writing timing (t_write1) into a buffer 1205 of a first reception side buffer write processor 1211, the necessary condition for reading timing (t_read2) can be determined from the buffer 1205 of a second reception side buffer read processor 1218. For example, in order to save the apparatus cost, the buffer size at the transmission side and reception side can be minimized. For example, if limiting the re-send times to 2 times only, it is determined as:

$$(t\_read2)-(t\_write1) \approx 2 \times (t\_re).$$

As a result, in FIG. 25, it is possible to set the buffer size at the transmission side and reception side to a minimum size.

Incidentally, the transmission and reception terminals can be synchronized by a common external sync signal. For example, GPS signals, or signals produced from the standard radio waves synchronized with the radio wave clock can be used. The sync signal can be also made from the terrestrial television broadcast signals or satellite television broadcast signals.

Thus, according to this embodiment, by comprising the re-send times limiter, the buffer size at the transmission side and reception side can be set to a minimum size, and the apparatus cost can be saved.

As explained herein, the invention has the following effects. That is, it presents an apparatus capable of composing an ATM wrapper transmission block capable of handling plural pieces of program information transmitted in SDTI signals or IP packet commonly by one ATM transmission data format. The ATM wrapper transmission block is compatible to both the AAL1 system and AAL5 system, and therefore if both the AAL1 and AAL5 are used in the ATM network, sequential connection is possible by changing over AAL1 transmission and AAL5 transmission in the ATM wrapper layer.

Also in the transmission apparatus using the AAL5, both minimum delay real-time streaming and error-free contribution are realized at the same time.

INDUSTRIAL APPLICABILITY

According to the present invention, digital video input signals sent in SDTI signals or IP signals can be transmitted to an ATM network. Not only one program, but also plural programs can be transmitted simultaneously. In ATM transmission, it is possible to transmit by changing over the AAL1 system and AAL5 system sequentially. In the AAL5 system of the ATM network, video data satisfying both requests of live transmission and contribution can be communicated. Therefore, by combining the high speed ATM network and high speed IP network, transmission and exchange of high quality video and audio contents can be presented seamlessly and inexpensively in a global-level wide range. As a result, the applications of video transmission by ATM are not limited to contribution of broadcast contents, but can be extended to remote medical treatment, remote education, high quality AV transmission between companies, distribution of video contents to household, and many others.

What is claimed is:

1. A video data communication apparatus for converting at least one input data stream including video data into other data stream and transmitting, comprising input means for entering one or more data streams, header information extracting and combining means for extracting specified information from the header included in said input data stream, shuffling, and creating other header information, video data extracting and combining means for extracting video data included in said input data stream and arranging in specified sequence, and wrapper generating means for multiplexing the output of said header information extracting and combining means and the output of said video data extracting and combining means, and combining into one wrapper transmission block, wherein the output of said wrapper generating means is transmitted.

2. The video data communication apparatus of claim 1, wherein the data stream to be entered includes at least SDTI stream specified in SMPTE standard 305M, IP packet data specified in IETF (Internet Engineering Task Force), or FC-AC stream of ANSI standard.

3. The video data communication apparatus of claim 2, wherein the video data to be transmitted as the payload of the data stream is data of DV system or DVCPRO system (SMPTE standard 314M).

4. The video data communication apparatus of claim 2, wherein the data stream to be entered is an SDTI stream, the header information extracting and combining means extracts the SDTI information which is the signal obtained by removing three words corresponding to "Ancillary Data Flag" of the SDTI header composed of 53 words specified in SMPTE standard 305M, and extracting the lower 8 bits of every word of the 50-word data replacing "Line Number 1" by "Reserved data."

5. The video data communication apparatus of claim 4, wherein the SDTI information is multiplexed once in the video data of one frame, and issued.

6. The video data communication apparatus of claim 1, further comprising processing means of ATM adaptation layer type 1 for receiving said wrapper transmission block issued from said wrapper generating means.

7. The video data communication apparatus of claim 1, further comprising clock recovery processing means for receiving said wrapper transmission block issued from said wrapper generating means, and adding the timing information for clock information reproduction at the reception side to the block, error compensation means for compensating either bit error or cell loss in the ATM network by receiving the output of said clock recovery processing means, and user PDU processing means of ATM adaptation layer type 5, wherein the output of said error compensation circuit is issued to said user PDU processing means.

8. The video data communication apparatus of claim 1, wherein said wrapper generating means generates one wrapper transmission block in one frame period of the video data by using the frame timing obtained from the frame signal of the entered video data.

9. The video data communication apparatus of claim 1, wherein said wrapper generating means generates one unit of wrapper transmission block each in the data corresponding to one frame period of one program of the entered video data.

10. The video data communication apparatus of claim 2, wherein the data stream to be entered is an IP stream including an IP packet, and said information extracting and combining means extracts the IP header from the IP packet, and issues IP information.

11. The video data communication apparatus of claim 10, wherein the data format of the IP information includes all of IP version information, reserved data, and IP information payload.

12. The video data communication apparatus of claim 11, wherein the reserved data is the size of IP information.

13. A video data communication apparatus for receiving at least one data stream including video data, and extracting and issuing the video data, comprising receiving means for receiving the data stream and extracting video data, memory means for temporarily storing the extracted video data, error detecting means for detecting presence or absence of error of the extracted video data, error compensation means for compensating the error portion of the extracted video data, error processing means for requesting re-send of at least a part of the extracted video data, and correcting the error portion of the extracted video data stored in said memory means on the basis of the video data re-sent according to the request, first output means for issuing video data of which error is compensated by said error compensation means, and second output means for issuing video data of which error is corrected by said error processing means.

14. The video data communication apparatus of claim 13, wherein said receiving means includes an AAL5 CPCS-PDU processor for receiving an ATM cell transmitted through an ATM network, and an AAL5 user PDU reception processor for receiving the ATM cell received in said AAL5 CPCS-PDU processor, said error compensation means includes an error compensation processor for compensating for error by receiving the PDU data of said AAL5 user PDU reception processor and error flag output, a first reception side buffer write processor for putting the output of said error compensation processor into a reception signal write region of said memory means, and a first reception side buffer read processor for reading out a signal of DV base format from said memory means, said first output means is live transmission output means having a first DV-based data building unit for converting the output of said first reception side buffer read processor into a data stream for live transmission of low delay type, said error processing means includes an error-free signal re-build processor for receiving the PDU data and error flag output from said error compensation processor, specifying the error, requesting re-send of re-send block data of a specified size including the specified error, and re-building an error-free signal from the re-sent data, a second reception side write processor for overwriting the error-free block signal constructed in said error-free signal re-build processor in a block signal region including error of the buffer, and a second reception side buffer read processor for reading out the error-free signal of the buffer, and said second output means is contribution output means having a second DV-based data building unit for converting the output of said second reception side buffer read processor into a contribution data stream of error-free type.

15. The video data communication apparatus of claim 14, further comprising signal converting means including an input terminal for receiving a stream including DV-based data, a DV-based data extracting unit for extracting DV-based data from the data stream entered from said input terminal, a transmission side buffer write processor for receiving the output of said DV-based data extracting unit and writing it into a transmission signal write region of said memory means, a transmission side buffer read processor for reading out the DV-based data from said memory means according to a specific rule, and an AAL5 user PDU transmission processor for converting the output of said transmission side buffer read processor into a user PDU of AAL5, means for converting the output of said AAL5 user PDU transmission processor into an ATM cell of AAL5 format, and sending out to the ATM network specified by a specific virtual path (VP) and virtual channel (VC), and re-sending means including an AAL5 re-send processor for re-sending said re-send block data entered from said error-free signal re-built processor by using said AAL5 CPCS-PDU processor according to AAL5.

16. The video data communication apparatus of claim 15, wherein the data stream to be entered from said input terminal is IEEE1394 stream transmitted according to IEEE1394, SDTI stream specified in SMPTE standard 305M, IP packet data specified in IETF (Internet Engineering Task Force), or FC-AV stream of ANSI standard.

17. The video data communication apparatus of claim 16, wherein the DV-based data to be transmitted as the payload of the IEEE 1394 stream, SDTI stream, IP packet data, or FC-AV stream is data of DV system or DVCPRO system (SMPTE standard 314M).

18. The video data communication apparatus of claim 15, wherein the AAL5 re-send processor is characterized by re-sending the error data by using TCP protocol or SSCOP protocol.

19. The video data communication apparatus of claim 13, wherein if an error flag is entered in said error compensation unit, it is concealed by replacing the data block including the error specified by the flag with other error-free data block.

20. The video data communication apparatus of claim 19, wherein the specific rule is a method of reading out by dividing the DV-based data of one frame into n pieces (n being a natural number) by a reading rule having a specific periodic law, and the concealing process is executed according to the specific periodic law.

21. The video data communication apparatus of claim 14, wherein in the transmission process using the AAL5, the stream is transmitted by Native ATM system or PDU/IP system.

22. The video data communication apparatus of claim 13, wherein said receiving means corresponds to Ethernet transmission system, and the stream is transmitted according to the PDU/IP system.

23. The video data communication apparatus of claim 15, wherein in order to specify efficiently the AAL5 format PDU discarded by the sequence number or time code information received in said error compensation processor, said transmission side buffer write processor divides the DIF-based data into plural sub-data groups according to a specific rule, and issued to the buffer after providing each sub-data group with at least one of sequence number and time code.

24. The video data communication apparatus of claim 15, wherein said transmission side buffer read processor reads out the DV-based data from the buffer according to a specific rule, and sends out to the AAL5 user PDU transmission processor after adding at least one of the sequence number and time code to the data being read out.

25. The video data communication apparatus of any one of claims 15, 23, and 24, wherein said transmission side buffer read processor reads out the DV-based data from said memory means according to a specific rule, prepares an audio data block by copying and extracting only the audio data from the DV-based data being read out, issues both DV-based data and audio data block to the ALL5 user PDU transmission processing block, and re-builds continuous audio data free from error in said error compensation processor by using the received data.

26. The video data communication apparatus of claim 25, wherein the audio data block generated in said transmission side buffer read processor is issued to said AAL5 user PDU transmission processor, and is transmitted by other VP, VC (virtual path, virtual channel) than the VP, VC for transmitting the DV data block from said AAL5 CPCS-PDU processor.

27. The video data communication apparatus of claim 26, wherein the bandwidth (or peak cell rate) of the other VP, VC for transmitting the audio data block is set in a narrower band than the bandwidth of the DV data block transmission.

28. The video data communication apparatus of claim 15, wherein in re-send process of re-send block data of specified size including error, re-send data is transmitted by other VP, VC (virtual path, virtual channel) than the VP, VC for transmitting the DV data block.

29. The video data communication apparatus of claim 15, further comprising means for generating test data for measuring the time required for re-sending the error signal, means for issuing the test data to the ATM network from the AAL5 re-send processor through said error signal re-send processor, and round-trip time measuring means for measuring the round-trip time which is the time required until recognizing the identification signal sent from the reception side showing that the data is normally received at the reception side, wherein a specific margin is added to the round-trip time, and the buffer reading address pointer of said second reception side buffer read processor is set.

30. The video data communication apparatus of claim 29, further comprising a re-send times limiter for limiting the number of times of re-send of error signal by said error signal re-send processor, wherein if the error is not eliminated after the limited number of times of re-send, the frame identification information of the DV data block is temporarily stored, together with the sequence number or time code relating to the error block in the memory of the re-send times limiter, and when normal data is obtained by re-sending repeatedly, the normal data is stored temporarily in the memory in the re-send times limiter in the frame unit together with the sequence number or time code, and the DV data in the frame unit is issued from the contribution output when the stream transmission is finished through the network.

31. The video data communication apparatus of claim 29, wherein the frame is synchronized between the transmission side terminal and reception side terminal by using a common external sync signal.

32. The video data communication apparatus of claim 31, wherein the common external sync signal is created from any one of the GPS signal, standard radio wave signal, terrestrial television broadcast signal, and satellite television broadcast signal.

33. A video data communication method for converting at least one input data stream including video data into other data stream and transmitting, comprising a step of entering one or more data streams, a header information extracting and combining step of extracting specified information from the header included in said input data stream, shuffling, and creating other header information, a video data extracting and combining step of extracting video data included in said input data stream and arranging in specified sequence, and a wrapper generating step of multiplexing the output of said header information extracting and combining step and the output of said video data extracting and combining step, and combining into one wrapper transmission block, wherein the output of said wrapper generating step is transmitted.

34. A video data communication method for receiving at least one data stream including video data, and extracting and issuing the video data, comprising a receiving step of receiving the input data stream and extracting video data, a memory step of temporarily storing the extracted video data, a error detecting step of detecting presence or absence of error of the extracted video data, an error compensation step of compensating the error portion of the extracted video data, an error processing step of requesting re-send of at least part of the extracted video data, and correcting the error portion of the extracted video data stored at said memory step on the basis of the video data re-sent according to the request, a first output step of issuing video data of which error is compensated at said error compensation step, and a second output step of issuing video data of which error is corrected at said error processing step.

* * * * *